US012426652B2

(12) United States Patent
Geiser et al.

(10) Patent No.: US 12,426,652 B2
(45) Date of Patent: *Sep. 30, 2025

(54) GLOVE DEVICE FOR PROTECTED INTERVENTION IN A CONTAINMENT

(71) Applicant: Skan AG, Allschwil (CH)

(72) Inventors: Christoph Joschi Geiser, Möhlin (CH); Frank Martin Lehmann, Binningen (CH)

(73) Assignee: Skan AG, Allschwil (CH)

( * ) Notice: Subject to any disclaimer, the term of this patent is extended or adjusted under 35 U.S.C. 154(b) by 406 days.

This patent is subject to a terminal disclaimer.

(21) Appl. No.: 17/631,351

(22) PCT Filed: Jul. 23, 2020

(86) PCT No.: PCT/CH2020/000009
§ 371 (c)(1),
(2) Date: Jan. 28, 2022

(87) PCT Pub. No.: WO2021/016726
PCT Pub. Date: Feb. 4, 2021

(65) Prior Publication Data
US 2022/0279877 A1 Sep. 8, 2022

(30) Foreign Application Priority Data

Jul. 30, 2019 (EP) .................... 19405012

(51) Int. Cl.
B25J 21/02 (2006.01)
A41D 19/015 (2006.01)
G21F 7/053 (2006.01)

(52) U.S. Cl.
CPC ............ A41D 19/015 (2013.01); B25J 21/02 (2013.01); G21F 7/053 (2013.01); B01L 2300/022 (2013.01)

(58) Field of Classification Search
CPC ....... A41D 19/015; B25J 21/02; B25J 21/005; G21F 7/053; G21F 7/04; B01L 1/04; B01L 2300/022
(Continued)

(56) References Cited

U.S. PATENT DOCUMENTS 2,695,605 A 11/1954 Gibbon
4,373,547 A * 2/1983 Geis .......................... F16P 1/00
141/98
(Continued)

FOREIGN PATENT DOCUMENTS

CH 707655 A1 8/2014
CH 709889 A2 1/2016
(Continued)

OTHER PUBLICATIONS

International Search Report of the International Searching Authority, along with an English translation, mailed on Oct. 5, 2020, issued in connection with International Application No. PCT/CH20/000009 (7 pages).
(Continued)

Primary Examiner — James O Hansen
(74) Attorney, Agent, or Firm — McCarter & English, LLP

(57) ABSTRACT

The invention relates to a glove device, the glove of which is provided for protected intervention in a working chamber of a containment through an access present in a port flange. The port flange is built into a front panel or into a wall of a housing of the containment positioned in an installation area. Machinery for processing goods to be treated can be provided in the working chamber. The glove device is designed as an assembly in the form of an insert which can be inserted into the port flange in a gas-tight manner, said glove device comprising, on one side, a seal which can be
(Continued)

Figure 1:
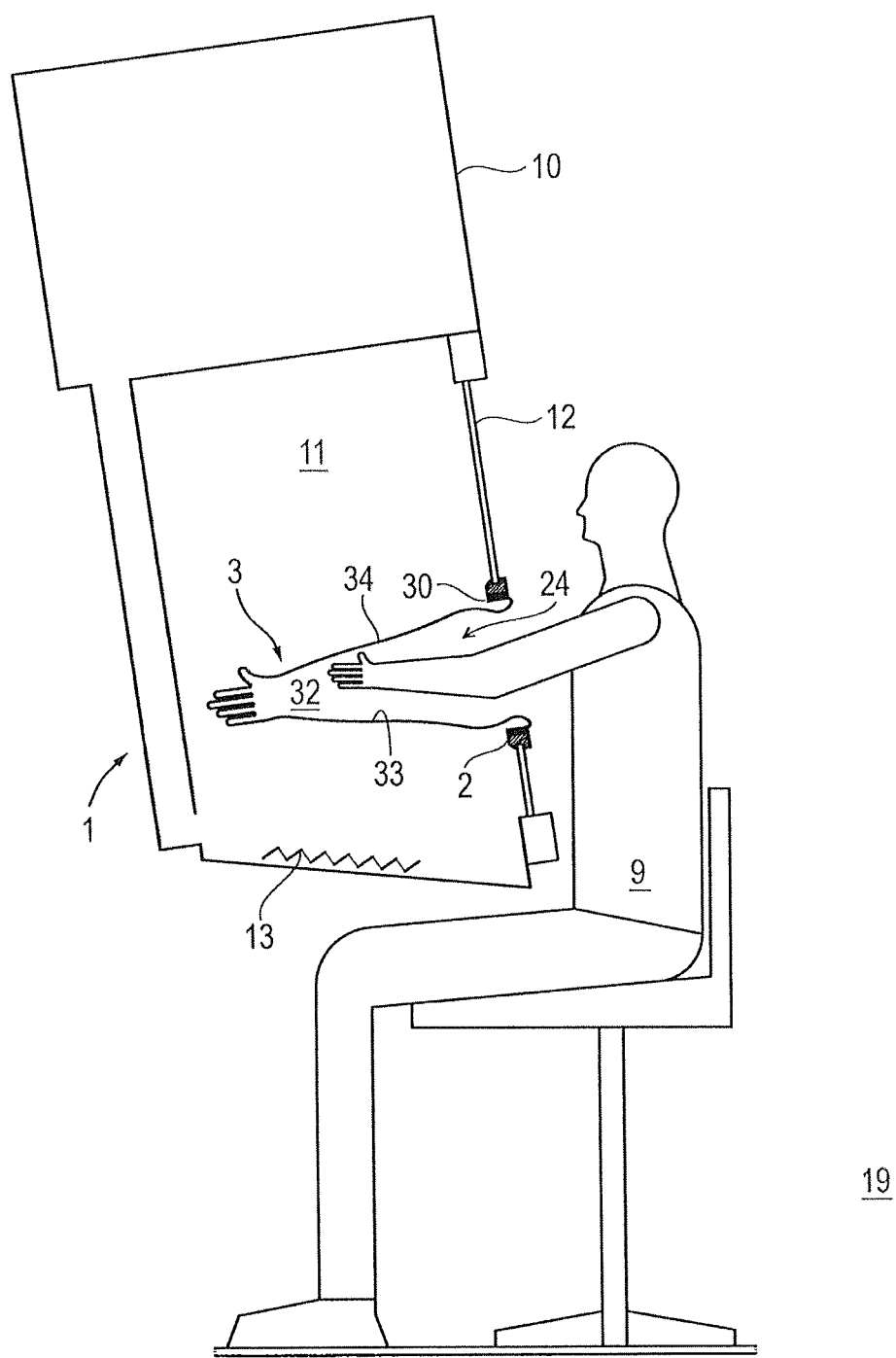

removed or is to be opened and, on the other side, a cover part or a shut-off part which is releasable from the assembly, and the vacuum-packed glove between these two sides.

9 Claims, 16 Drawing Sheets

(58) Field of Classification Search
USPC .............................................................. 312/1
See application file for complete search history.

(56) References Cited

U.S. PATENT DOCUMENTS

| | | | |
|---|---|---|---|
| 5,861,305 A * | 1/1999 | Silley | .................... C12M 41/14 |
| | | | 422/527 |
| 9,589,689 B2 | 3/2017 | Fournier | |
| 10,617,045 B1 * | 4/2020 | Judy | .................... H05K 9/0015 |
| 2005/0269916 A1 | 12/2005 | Oyama et al. | |
| 2012/0267367 A1 | 10/2012 | Armau et al. | |
| 2015/0243392 A1 | 8/2015 | Fournier | |
| 2020/0171681 A1 | 6/2020 | Copley et al. | |
| 2022/0324123 A1 | 10/2022 | Geiser et al. | |

FOREIGN PATENT DOCUMENTS

| | | |
|---|---|---|
| DE | 3616893 C1 | 9/1987 |
| FR | 1147608 A | 11/1957 |
| JP | H01223397 A | 9/1989 |
| JP | H0270009 A | 3/1990 |
| JP | H094897 A | 1/1997 |
| WO | 2018/108956 A1 | 6/2018 |

OTHER PUBLICATIONS

Written Opinion of the International Searching Authority, mailed on Oct. 5, 2020, issued in connection with International Application No. PCT/CH20/000009 (7 pages).
Jugitec Save Glovebox Gloves by Jung Gummitechnik GmbH, https://jugitec.de, Jul. 25, 2019 (4 pages).
International Search Report of the International Searching Authority, along with an English translation, mailed on Oct. 5, 2020, issued in connection with International Application No. PCT/CH20/000008 (6 pages).
Written Opinion of the International Searching Authority, mailed on Oct. 5, 2020, issued in connection with International Application No. PCT/CH20/000008 (7 pages).
Office Action dated Nov. 15, 2024, issued in connection with U.S. Appl. No. 17/631,370 (8 pages).
Examiner-Initiated Interview Summary dated May 5, 2025, issued in connection with U.S. Appl. No. 17/631,370 (1 page).
Notice of Allowance dated May 13, 2025, issued in connection with U.S. Appl. No. 17/631,370 (6 pages).

* cited by examiner

Fig. 5A
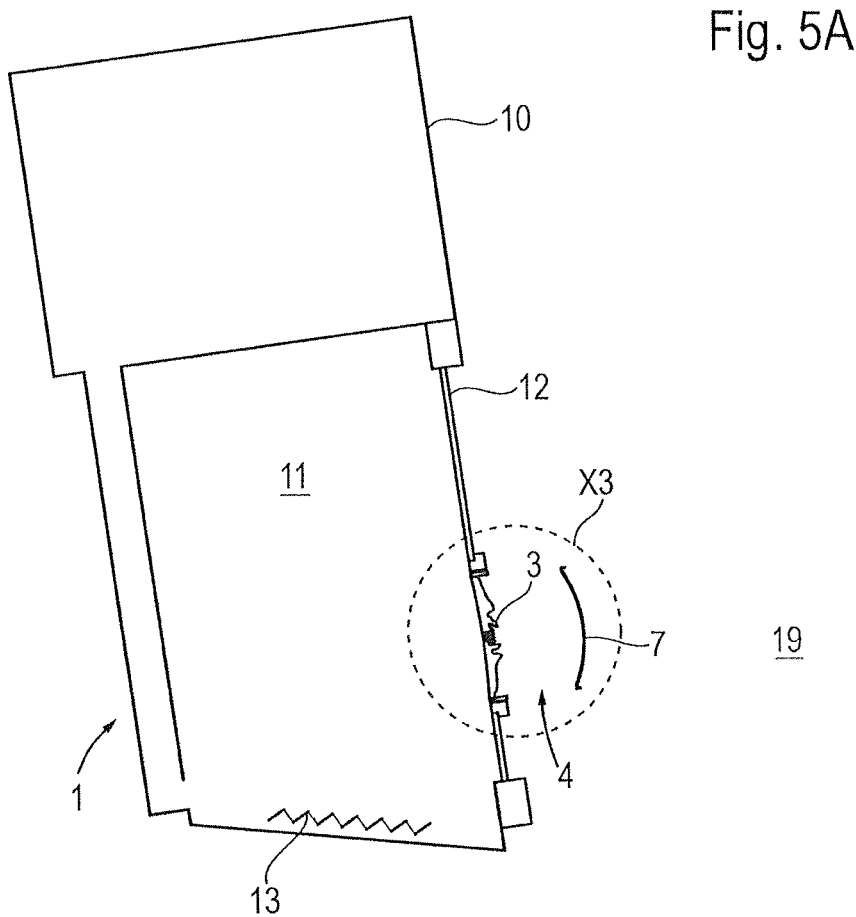
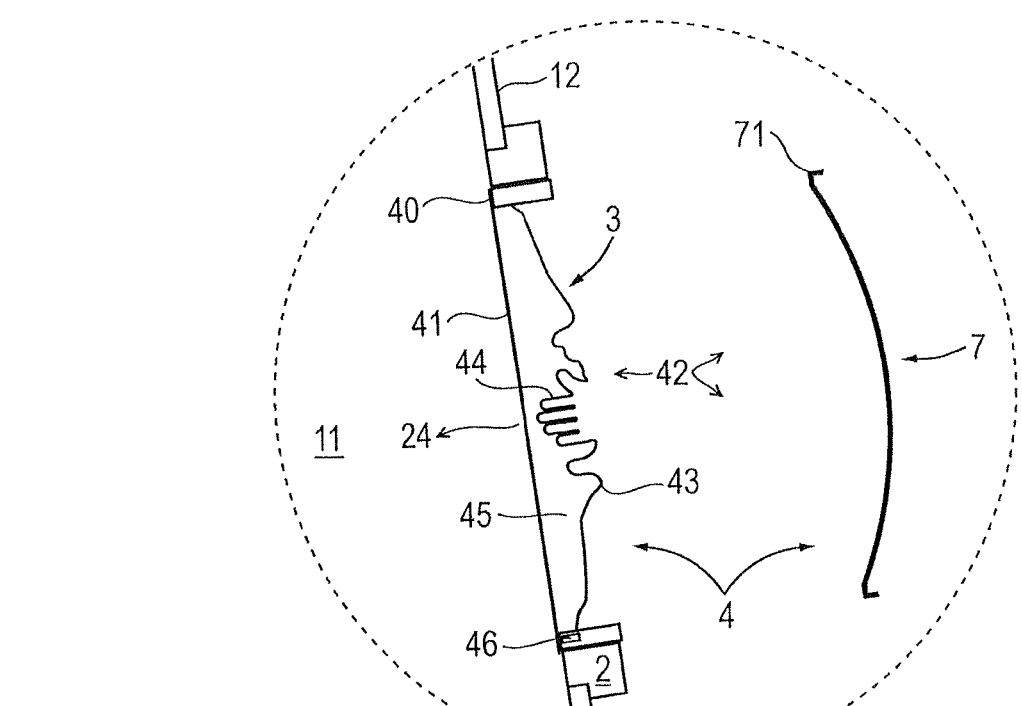
Fig. 5B

GLOVE DEVICE FOR PROTECTED INTERVENTION IN A CONTAINMENT

RELATED APPLICATIONS

This application is a U.S. National Phase Application under 35 U.S.C. 371 of International Application No. PCT/CH2020/000009 filed Jul. 23, 2020, which claims the benefit of European Patent Application No. 19405012.3 filed on Jul. 30, 2019. The disclosures of these applications are incorporated herein by reference in their entireties.

FIELD OF THE INVENTION

The present invention relates to a glove device with a glove for protected intervention in a work chamber of a containment through an access present in a port flange. The port flange is installed in a front window or in a wall of a housing of the containment positioned in an installation space. The work chamber usually contains equipment for processing material to be treated, for example pharmaceuticals or biotechnical substances. In conjunction with the glove device, an arrangement for protecting against unauthorized intervention in the work chamber using the glove from the glove device by means of a shut-off part for temporarily blocking the access is proposed.

PRIOR ART

For example, Jung Gummitechnik GmbH, D-64683 Einhausen/Germany, offers on its website (see https://jug-itec.de/; Internet excerpt from 25 Jul. 2019), a range of Glovebox gloves, inter alia that called the Jugitec® Pharma, which is a glove made of ethylene-propylene-diene rubber (EPDM). This glove, which is conventional per se, is advertized as having good touch sensitivity, conformity of the ingredients to the FDA safe list, compatibility with the criteria of the pharmaceutical, medical and food industries, suitability for EX applications, and suitability for steam sterilization.

According to the prior art (see FIG. 1), conventional gloves 3 of this kind are installed in the port flanges 2 of containments 1 arranged in an installation space 19. In so doing, the cuff 30 of the glove 3 is pulled over a generally removable ring and usually sealed with O-rings against the port flange 2 installed in the front window 12 or a wall of the containment housing 10. An access 24 is thus created in the work chamber 11 of the containment 1. At the glove 3 stretched forward from an operator 9 into the work chamber 11, the inner face 33 and the outer face 34 and also the interior 32 formed by the glove 3 are designated.

In preparation for the start of production mode at the containment 1, it is already mandatory to check the glove 3 for leaks—using test equipment—which requires additional equipment and time at the site, for example at the pharmaceutical manufacturer. Furthermore, the complete outer face 34 of the glove 3 facing the work chamber 11 must be decontaminated together with the containment 1. For this purpose, so-called glove stretchers (see, for example, CH 707 655 A1 originating from the applicant) are usually inserted into the glove 3 in order to treat all surface areas with sufficient intensity by stretching with the applied $H_2O_2$ gas flow, for example. Due to the large and strongly formed outer face 34, a correspondingly long decontamination time is required. Frequent decontaminations or cleanings are necessary, especially in the case of aseptically or toxically operated containments 1, often with the requirement to fit completely new gloves 3, so that the effort described above is repeated. In the shown example and as is usual, equipment 13 for processing material to be treated is provided in the work chamber 11.

OBJECT OF THE INVENTION

Proceeding from the prior art already known, the invention addresses the problem of proposing a solution for significantly reducing the effort prior to the use of the glove at the location of the containment equipped with said glove, for example at the pharmaceutical manufacturer. Furthermore, it is sought to provide a glove which, instead of a surface decontamination, for example by means of an $H_2O_2$ gas flow, has undergone a higher-quality thermal or gamma sterilization.

An additional problem lies in completing the solution to be created with protective measures in order to prevent unauthorized intervention in the work chamber through the access present in the port flange using the glove, by means of a shut-off part. It is assumed here that the containment usually has multiple port flanges, which are all to be provided with a glove each. The intention here is to prevent unauthorized interventions by operators, in the form of "uncontrolled human interventions", and thus in particular to make the production of pharmaceuticals loss-free and safer and to ensure a comprehensive logging of all actions performed at the port flange.

OVERVIEW OF THE INVENTION

The glove device with a glove is provided for protected intervention in a work chamber of a containment through an access present in a port flange. The port flange is installed in a front window or in a wall of a housing of the containment positioned in an installation space. Equipment for processing a material to be treated can be provided in the work chamber. The glove device is designed as a module, in the form of an insert, which can be inserted gas-tight into the port flange. A seal which is removable or which is to be opened is arranged on one side and a cover part or a shut-off part which is releasable from the module is arranged on the other side. The glove is located in vacuum-packed form between the two and has an inner face and a surface.

Specific embodiments of the invention will be defined hereinafter: The glove device also has a fixing part, which is intended to be fastened gas-tight to the port flange. The fixing part is annular or oval and preferably consists of plastic. The cover part or the shut-off part is preferably shell-like and preferably likewise consists of plastic.

When the cover part of shut-off part is mounted on the glove device and the seal is intact, a front space in which a negative pressure prevails is located between the seal and the surface. The front space and the inner face of the seal facing said front space and the surface of the glove are sterile.

When the cover part of shut-off part is mounted on the glove device and the seal is intact, an interior in which a negative pressure prevails is located between the inner face of the glove and the cover part or shut-off part. The interior and the inner face of the cover part or the shut-off part facing said interior and the inner face of the glove are sterile.

The free end of the glove is fastened to the fixing part and/or to the seal in the vicinity of the fixing part, wherein the seal at least substantially spans the clear width of the fixing part. When the shut-off part or cover part is mounted on the glove device and the seal is intact, the seal is visually noticeably curved concavely relative to the glove device as a result of the negative pressure prevailing therein.

An RFID chip is arranged in the fixing part and has, stored therein, an individual serial number and preferably additionally production data. The RFID chip is preferably writable, and all new actions at the glove device, including those performed at the glove, are captured and added in the RFID chip or in the control unit to the individual maintenance data of the glove device.

The shut-off part provided as an integral part of the glove device and removable therefrom can be used for protection against unauthorized intervention in the work chamber of the containment through the access present in the port flange using the glove. Or, to protect against such unauthorized intervention, a shut-off part is provided, which is designed as a closure body which is directly integrated in the port flange, formed in a pivotable, stretchable, shutter-like or expandable manner, or is provided as a separate closure body which can be docked on and removed from the closure body. The shut-off part provided as an integral part of the glove device and removable therefrom has an extension which is intended for cooperation with a switchable retaining element extending from the port flange in order to temporarily secure the shut-off part additionally to the port flange.

The cover part or the shut-off part has a magnetic zone which is intended for cooperation with the fixing part in order to additionally secure the cover part or the shut-off part temporarily. If the cover part or the shut-off part is released from the glove device, the magnetic zone can also be used in order to deposit the cover part of shut-off part at a parking station.

In the event that multiple port flanges are installed on the containment, there is one glove device fastened to each port flange.

To record personal data of an operator, a capture unit is provided, which has a connection to a microcontroller, in order to issue a switching command to an activator if there is correspondence between the captured personal data and the data in the microcontroller, whereby the shut-off part can be brought into a blocking position or can be moved therefrom into an open position and therefore the access is blocked or accessible, respectively. The activator is arranged on the port flange or on the shut-off part. The data of the microcontroller are stored directly therein or originate from an external control unit.

The capture unit for recording personal data of the operator is assigned to the corresponding port flange or the corresponding shut-off part. If there is correspondence between the captured personal data and the data in the microcontroller, the operator receives authorization by switching command from the microcontroller to fit this specific shut-off part to this specific port flange and to bring it into the blocking position or to unlock it and to remove it from this specific port flange, whereby the access is blocked or accessible, respectively.

The capture unit for recording personal data of the operator can be provided directly in the corresponding port flange or the corresponding shut-off part. Alternatively, the capture unit is designed for all relevant port flanges and shut-off parts of the containment in a mobile device, for example in a tablet computer.

The shut-off part, in the configuration as a closure body integrated in the port flange, and the port flange are each provided with a safety sensor. The two pairs of safety sensors are used, in cooperation with an external safety relay, to capture the position of the shut-off part in the port flange and, when the shut-off part is open, to activate an automatic blocking of the equipment.

Or, the shut-off part, in the configuration as a separate closure body which can be docked on or removed from the port flange, and the port flange are each provided with a safety sensor. The two safety sensors are used, in cooperation with an external safety relay, to capture the position of the shut-off part in relation to the port flange and, when the shut-off part is distanced from the port flange, to activate an automatic blocking of the equipment.

Or, the shut-off part, in the configuration as a closure body which is releasably connected to the glove device and which can be locked on and removed from the port flange, and the port flange are each provided with a safety sensor. The two pairs of safety sensors are used in this case too, in cooperation with an external safety relay, to capture the position of the shut-off part in relation to the port flange and, when the shut-off part is distanced from the port flange, to activate an automatic blocking of the equipment.

Each control unit and thus each cooperating safety relay per port flange is assigned a transmitter/receiver. The active safety sensor in the port flange or in the shut-off part serves to identify whether the complementary passive safety sensor is present, wherein a transmitting/receiving element wirelessly signals an absence of the passive safety sensor to the transmitter/receiver, whereupon the transmitter/receiver communicates the absence of the passive safety sensor to the safety relay and automatically blocks the equipment.

The shut-off part, in the configuration as a separate closure body which can be docked on or removed from the port flange, or the port flange are provided with the capture unit, the microcontroller and an activator, which is actuatable manually or in a driven fashion and serves to move the shut-off part into the blocking or open position. In addition, this shut-off part or the port flange can be equipped with a display and a battery.

The port flange has an RFID chip. The shut-off part, in the configuration as a separate closure body which can be docked on or removed from the port flange, is provided with a transmitting/receiving element. The transmitting/receiving element is used, when fitting the shut-off part on the port flange, to detect this pairing and to permit or refuse the locking of the shut-off part according to the data stored in the control unit or in the microcontroller.

The data stored in the RFID chip which is arranged in the fixing part can be read by means of the transmitting/receiving element and are stored in the control unit and/or in the microcontroller. Each new action at the port flange and at the glove device is captured by means of the control unit and is stored therein for the relevant glove device, that is to say is added to the individual maintenance data.

The production data of each glove device can comprise:
the individual serial number;
the production date;
the glove size;
the material type;
the used sterilization method; and
the maximum use-by date.

The maintenance data of each glove device can comprise:
the date of installation in a port flange;
the personal data of the installer;
the identifier of the port flange on which the installation was performed;
when, how often and by which operator the shut-off part at the relevant glove device was brought into the blocking position or moved therefrom into the open position;

the time and count of the number of decontamination cycles at the work chamber of the containment and the maximum permissible number of decontamination cycles;

the time and number of the leak tests performed on the relevant glove device;

the batches and products which are handled in the work chamber of the containment and for which the relevant glove device is used;

special events to be input manually by the operator; and the personal data of the installer performing the disassembly and disposal of the relevant glove device.

The capture unit is intended for recording biometric identifiers of the operator, a code to be input by the operator, or the electronic data of a data carrier to be presented by the operator. The identifier recorded by the capture unit from the operator grants or otherwise denies the operator who is wishing to become active authorization to move the shut-off part into the blocking or open position at the relevant port flange; this is performed in cooperation with the microcontroller depending on the data stored in the microcontroller or data received via the control unit.

BRIEF DESCRIPTION OF THE ACCOMPANYING DRAWINGS

Figure 2A:
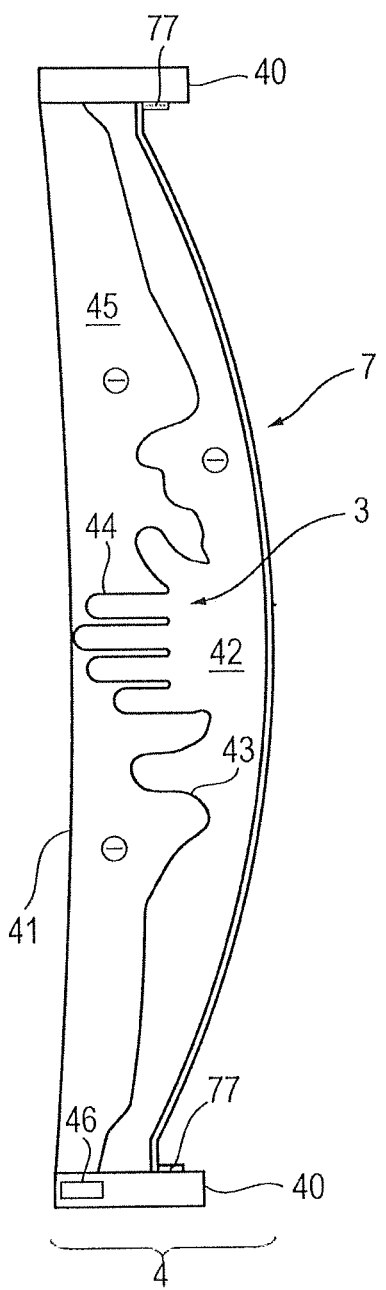
Figure 2B:
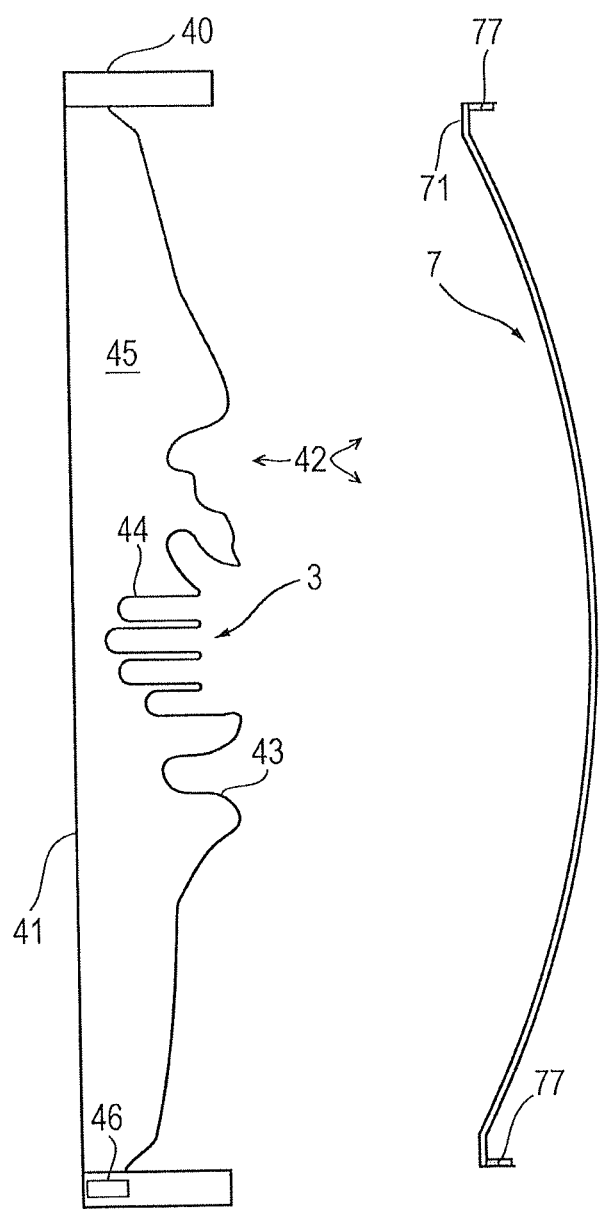
Figure 3A:
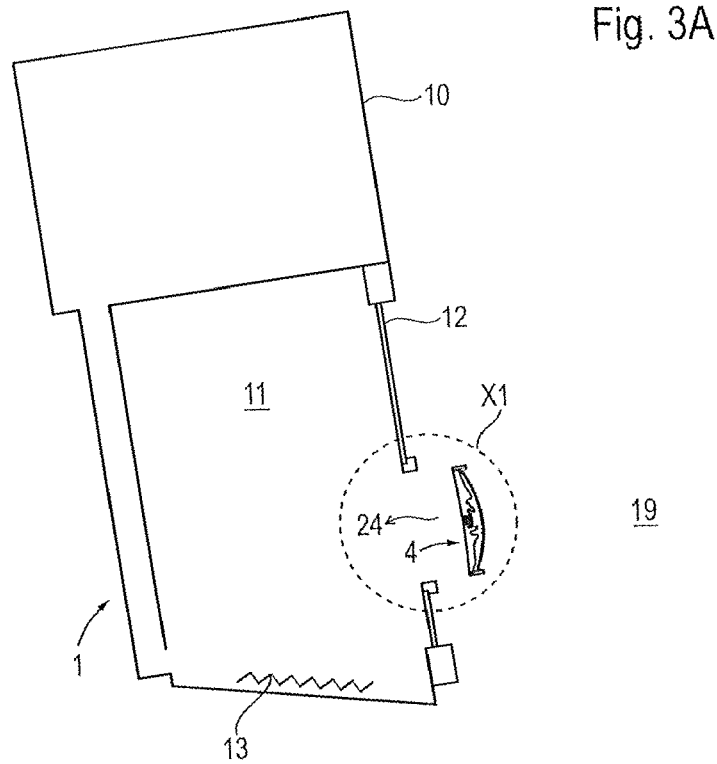
Figure 3B:
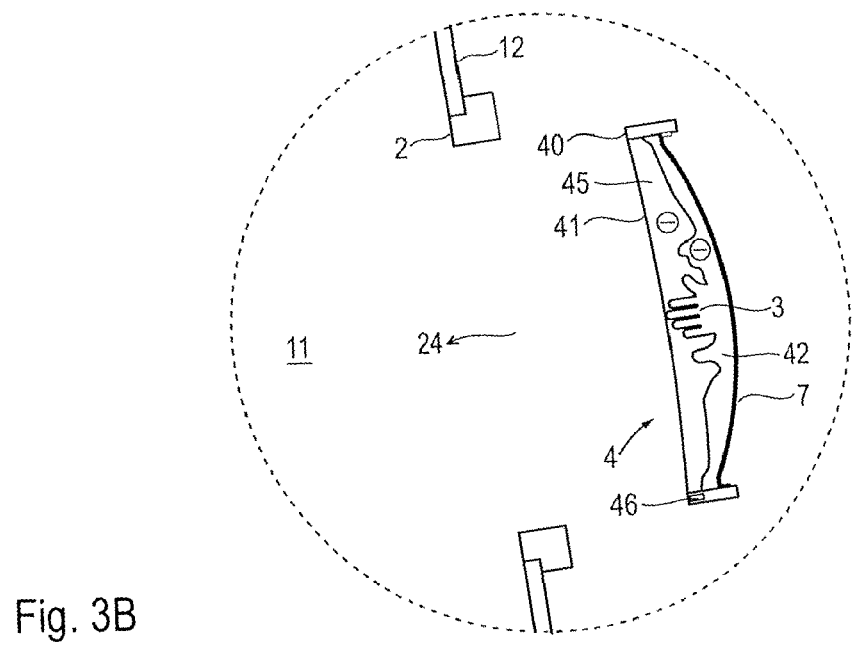
Figure 4A:
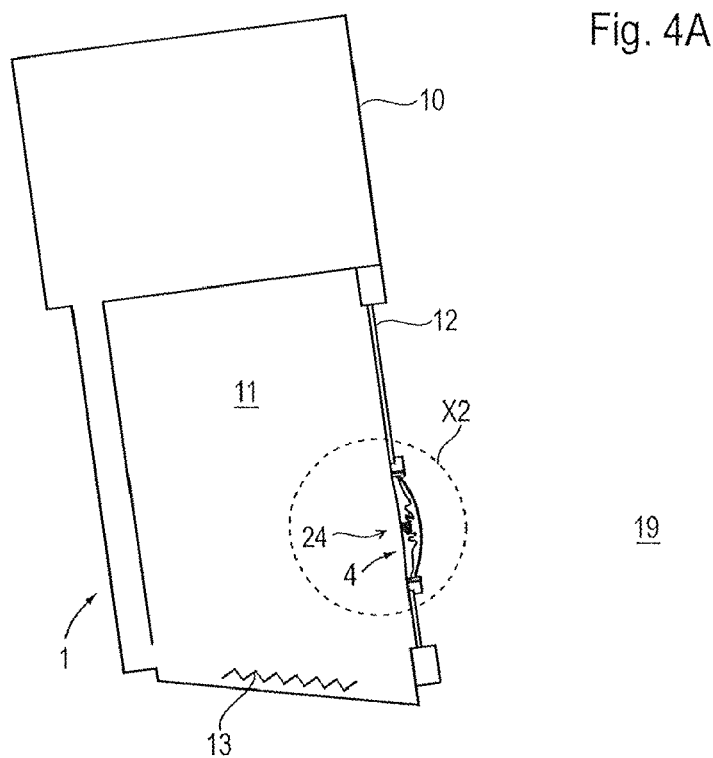
Figure 4B:
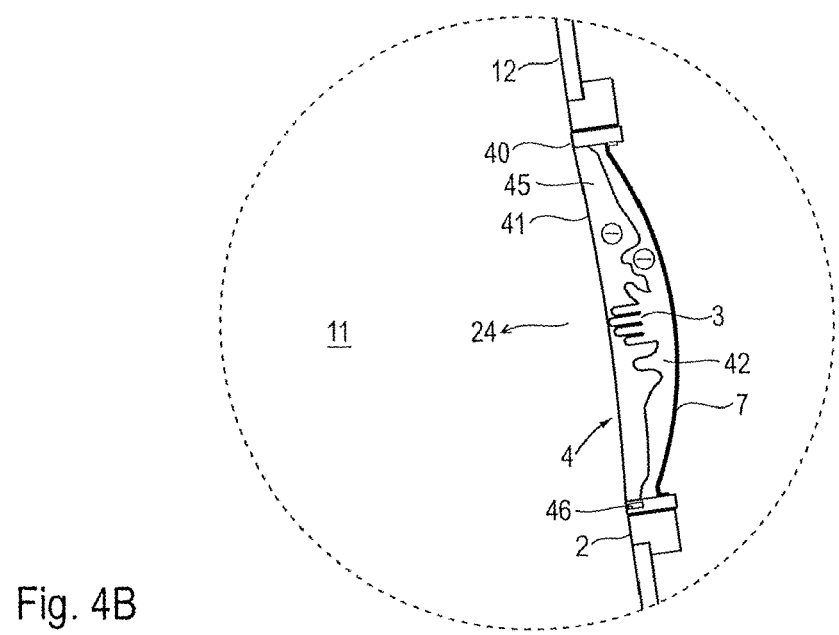
Figure 6:
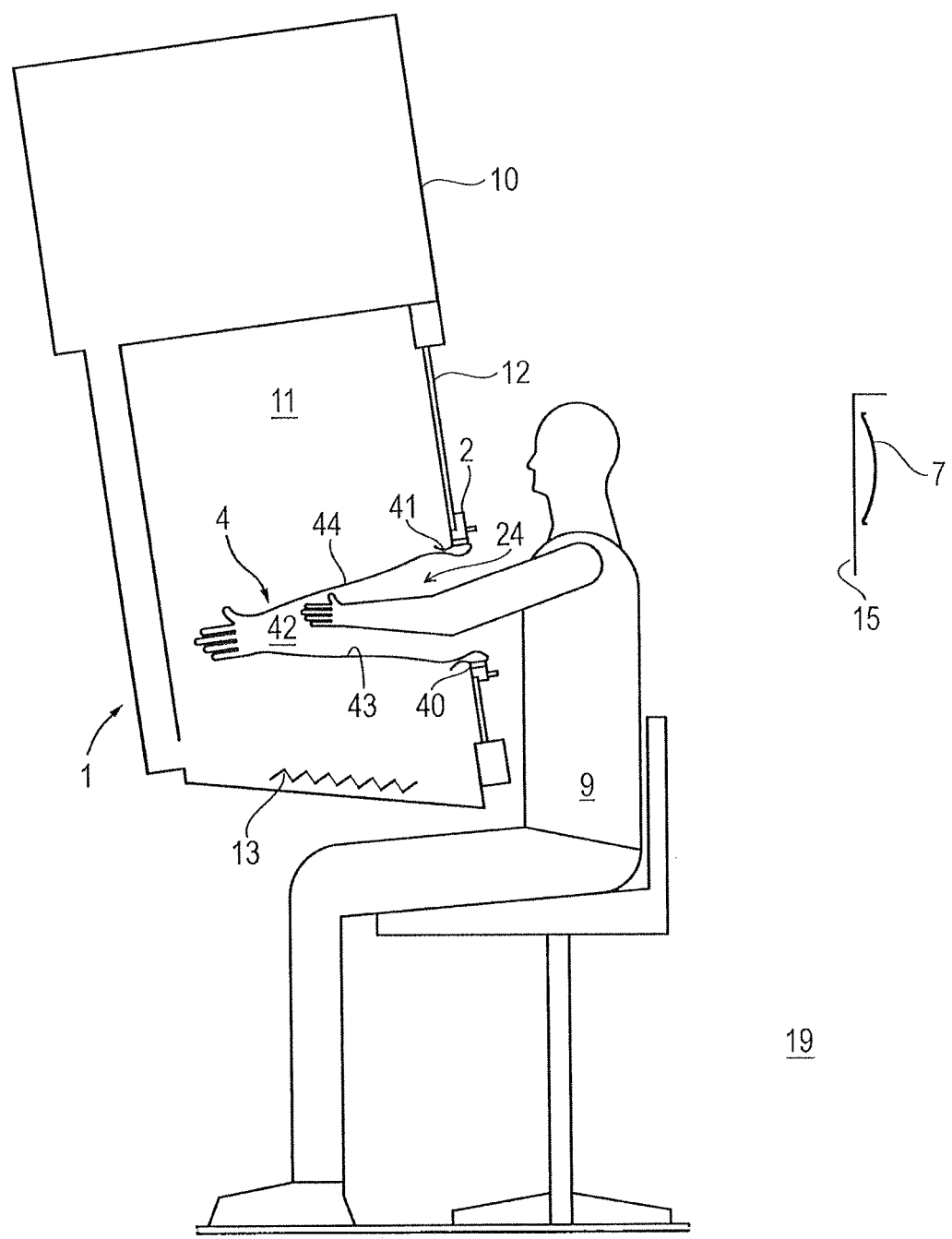
Figure 7:
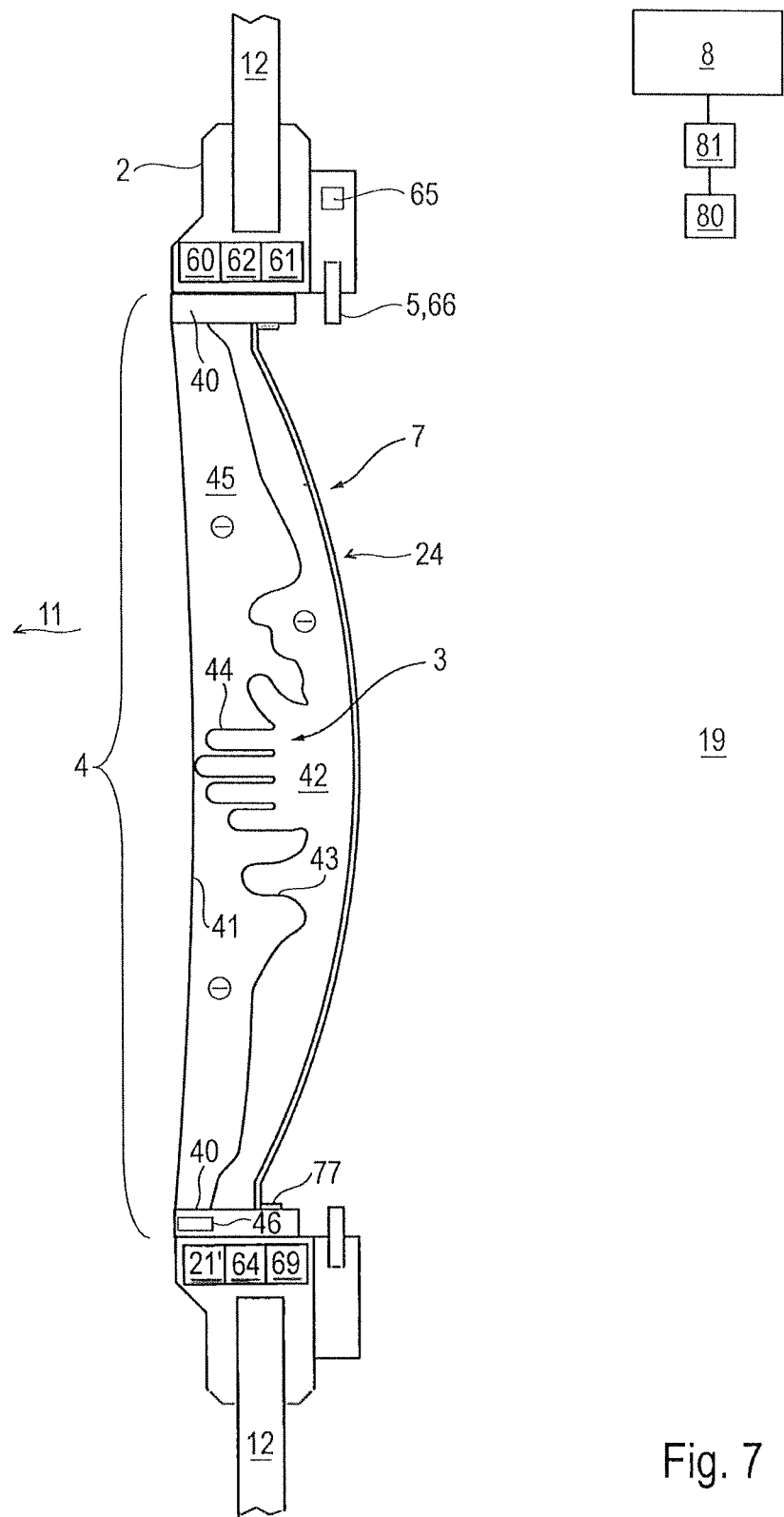
Figure 8A:
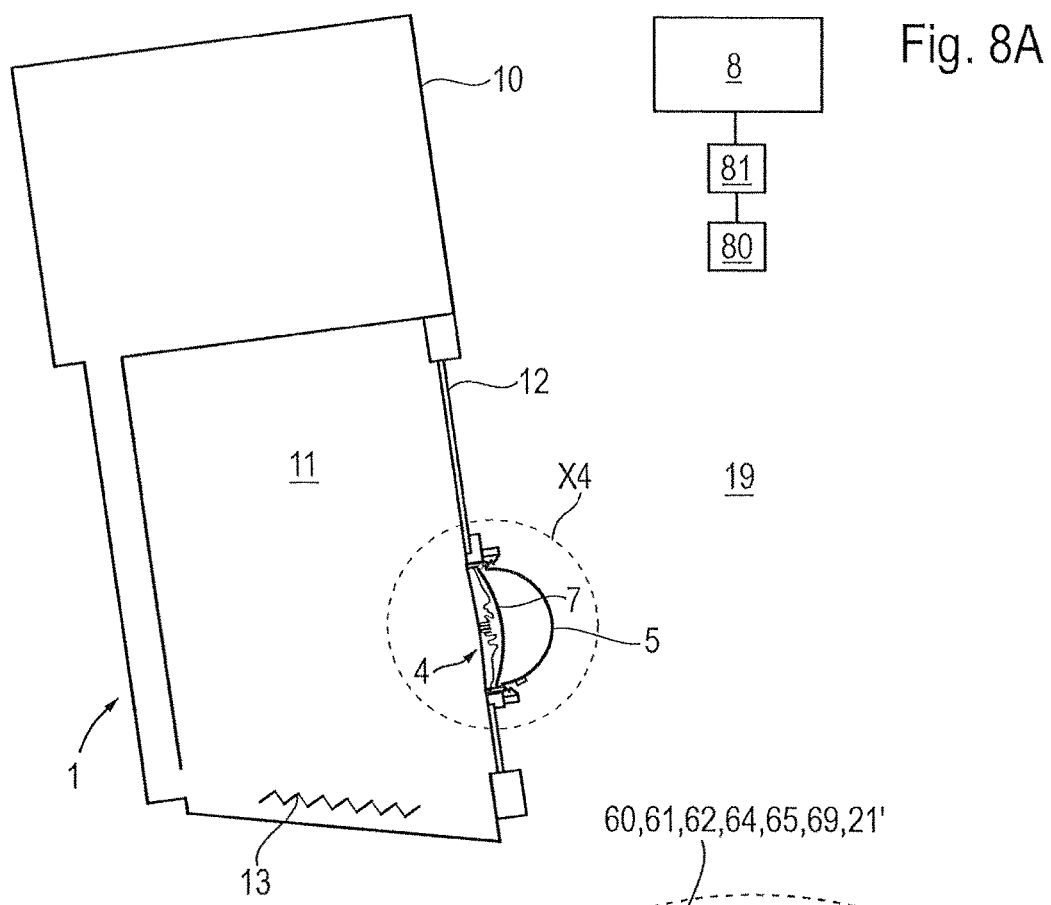
Figure 8B:
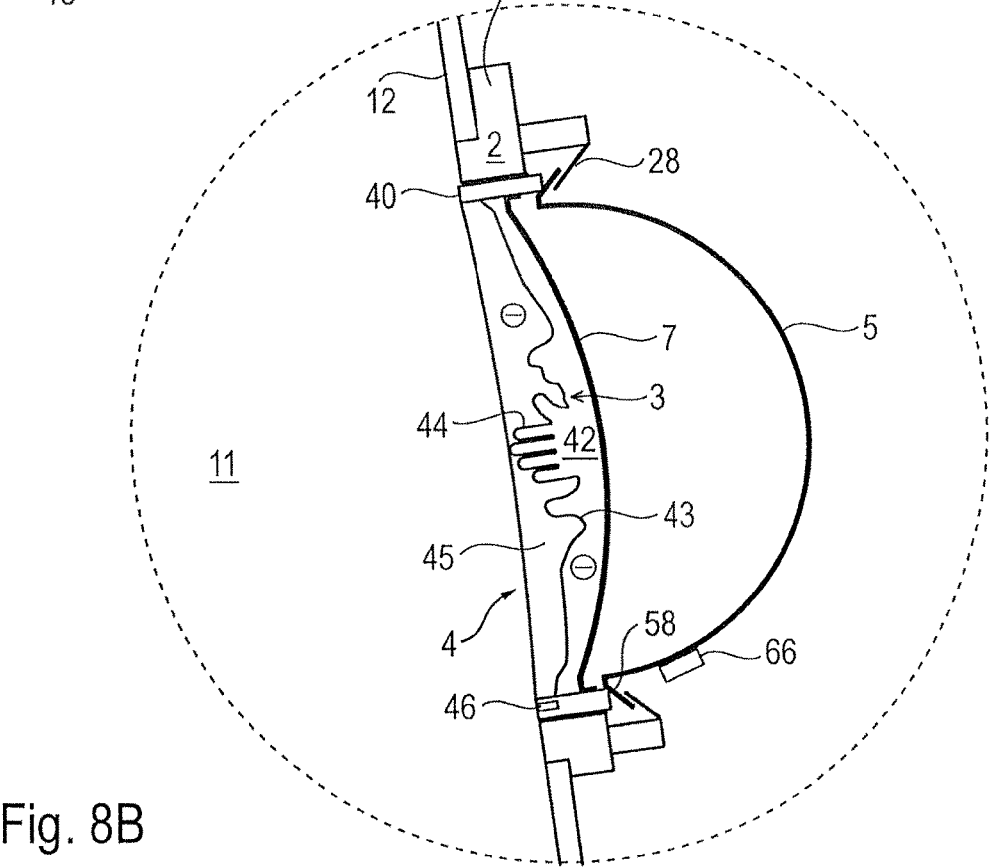
Figure 9A:
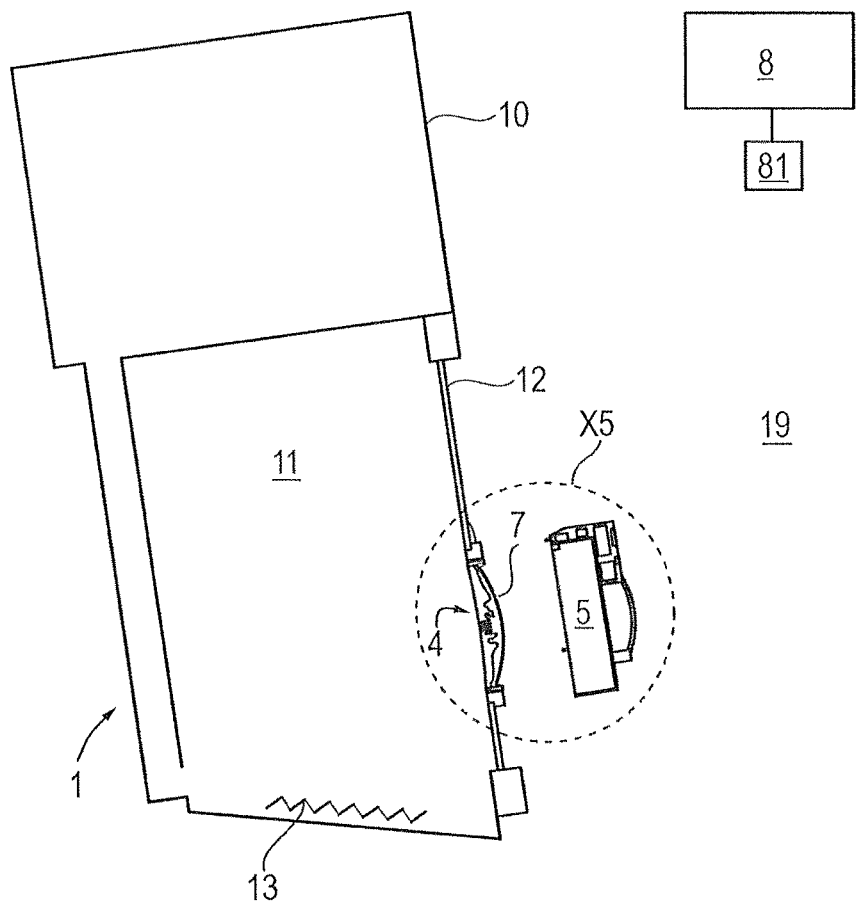
Figure 9B:
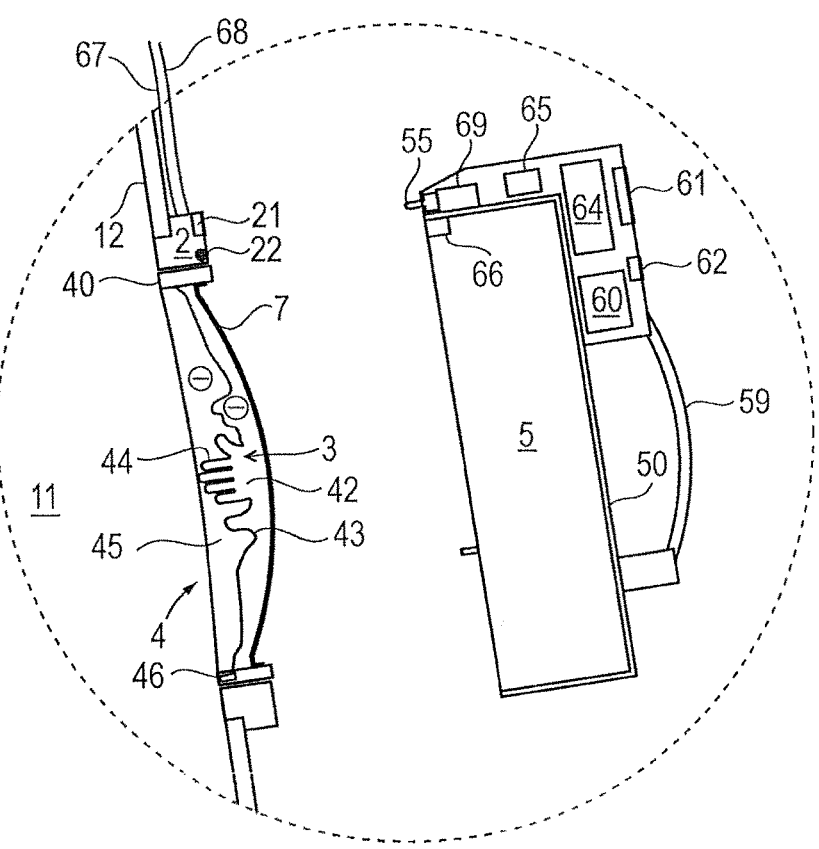
Figure 9E:
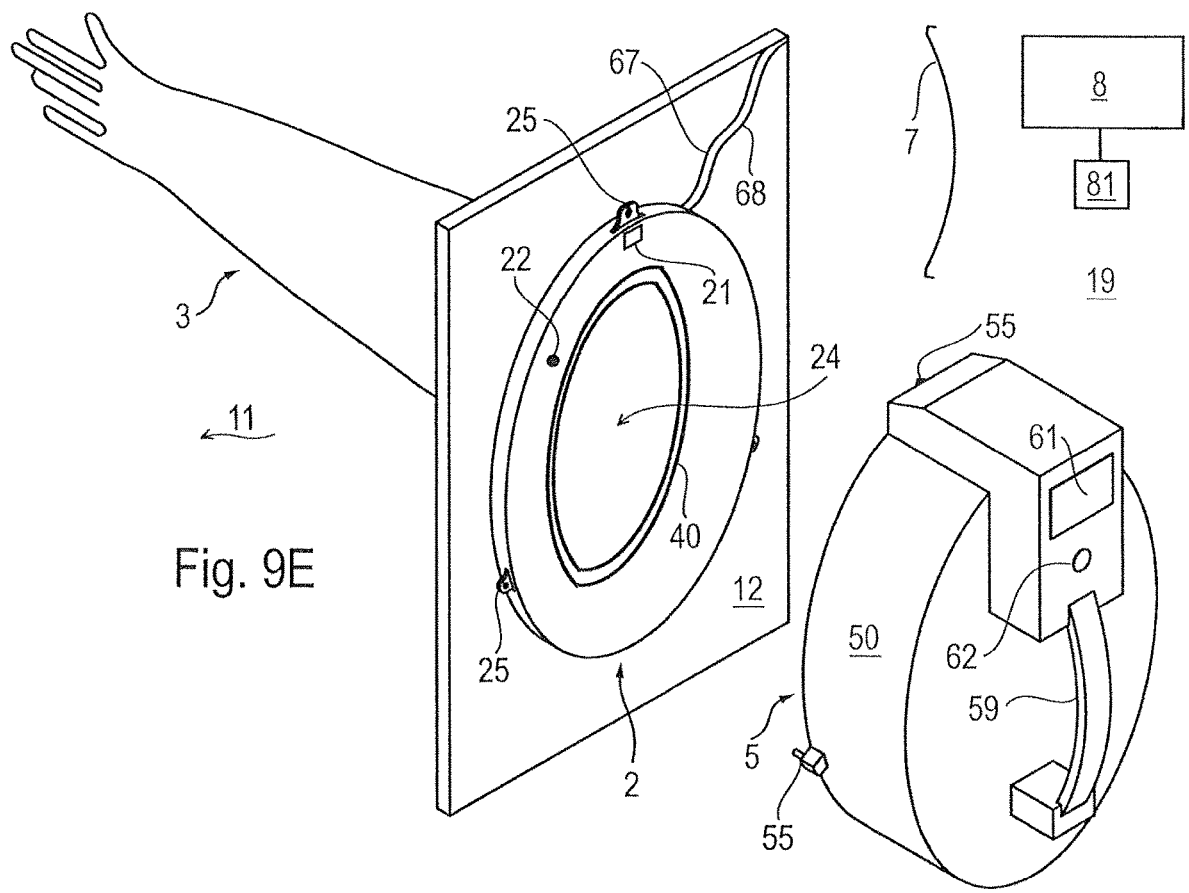
Figure 9C:
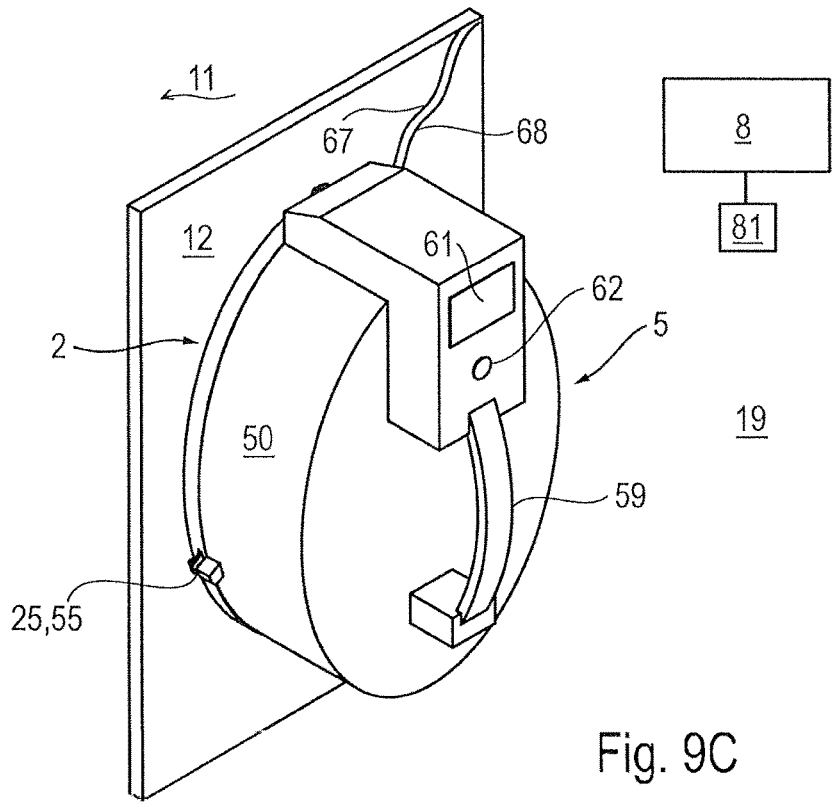
Figure 9D:
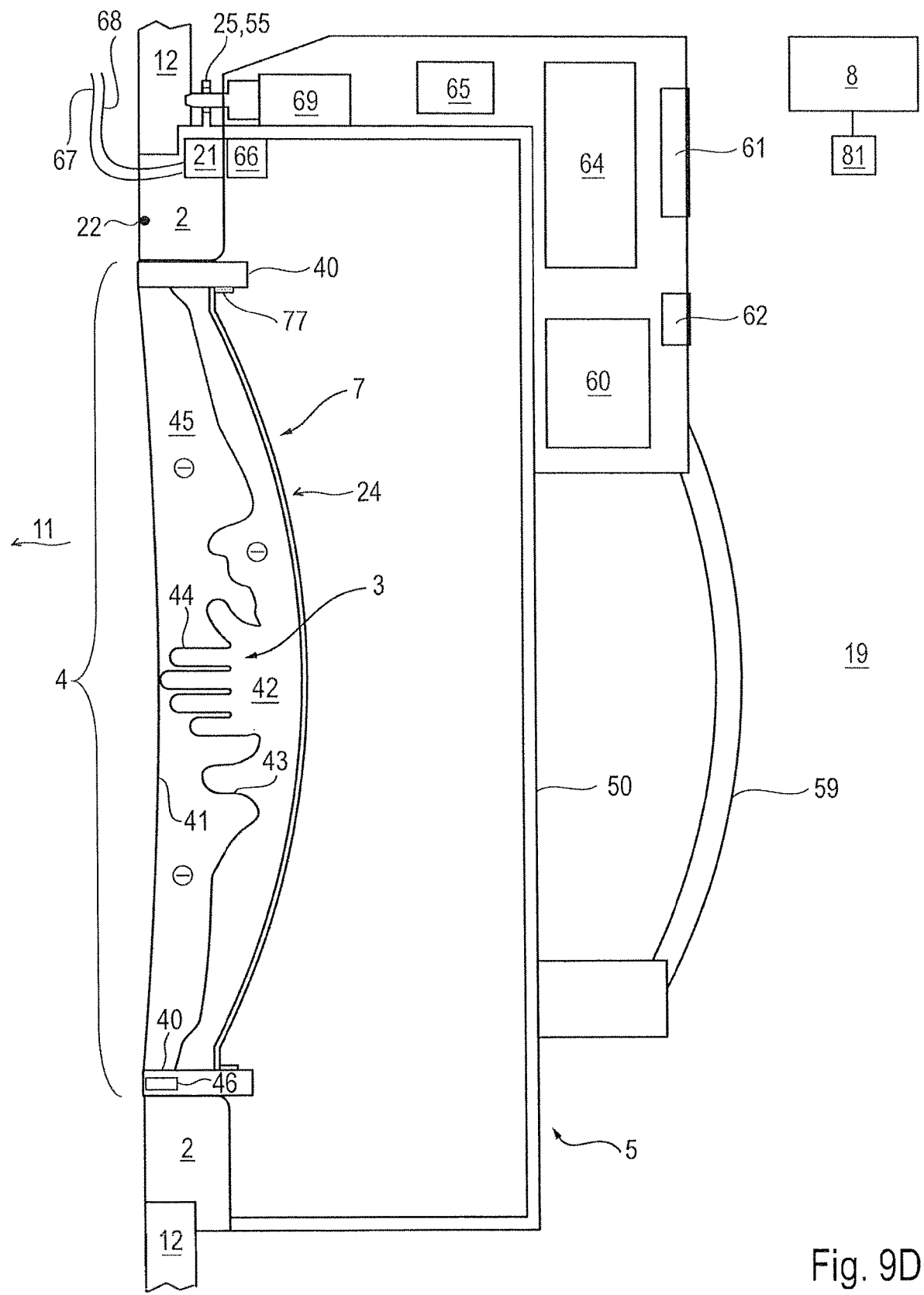
Figure 10A:
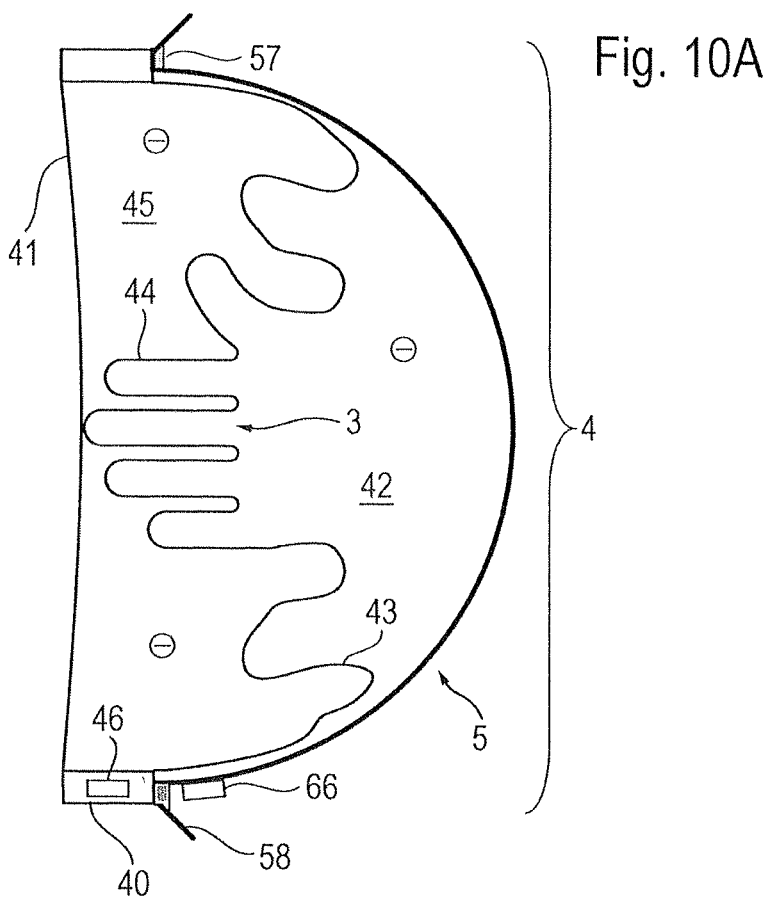
Figure 10B:
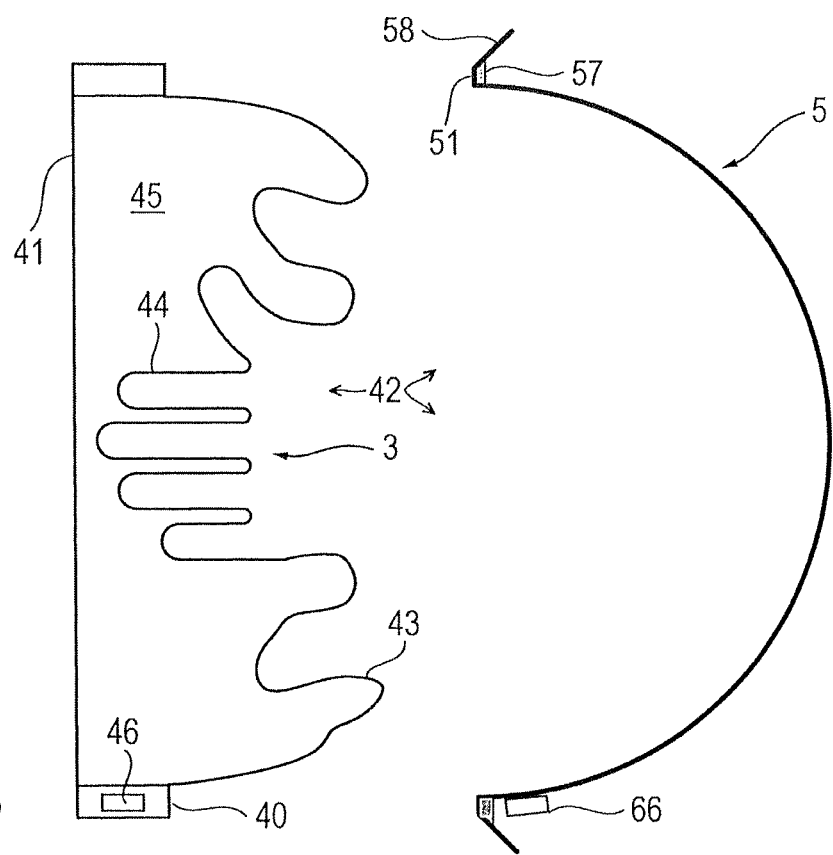
Figure 11A:
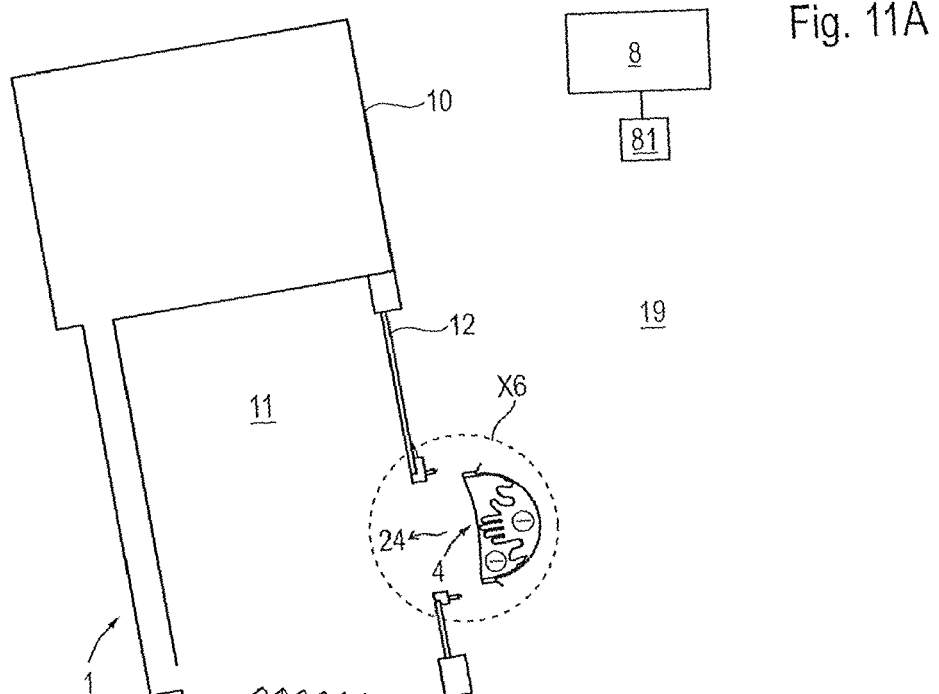
Figure 11B:
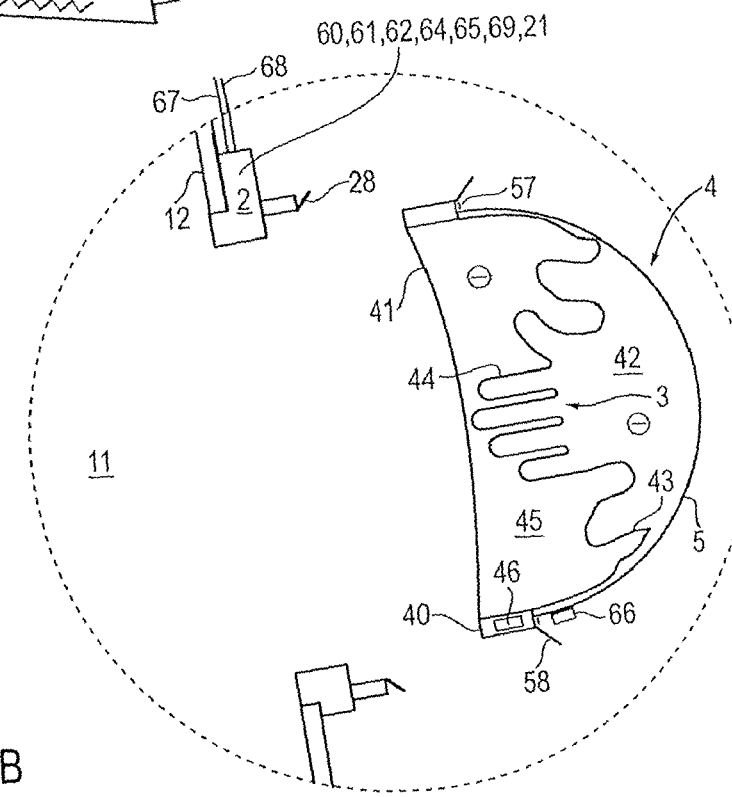
Figure 12A:
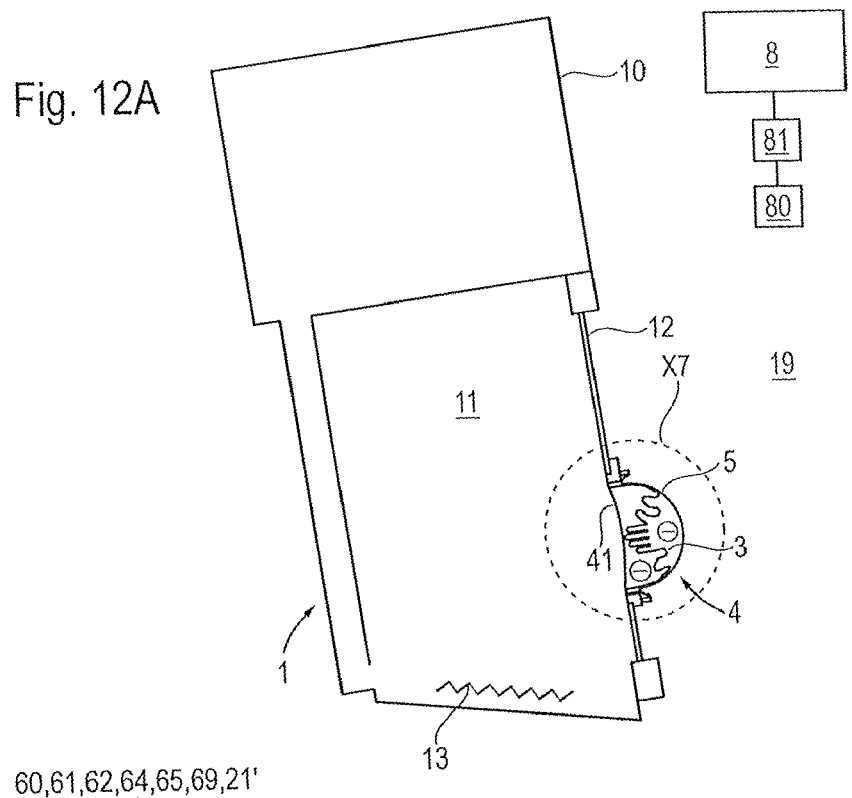
Figure 12B:
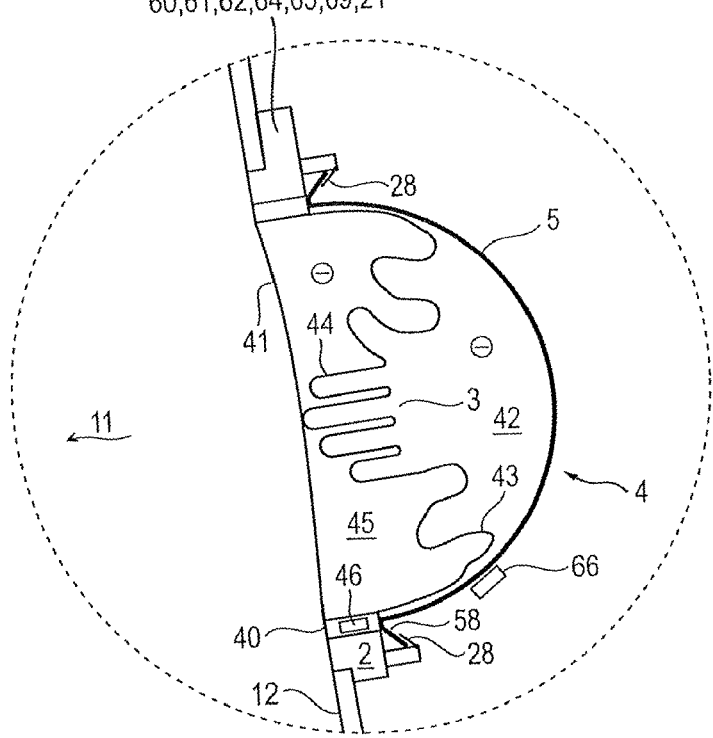
Figure 13A:
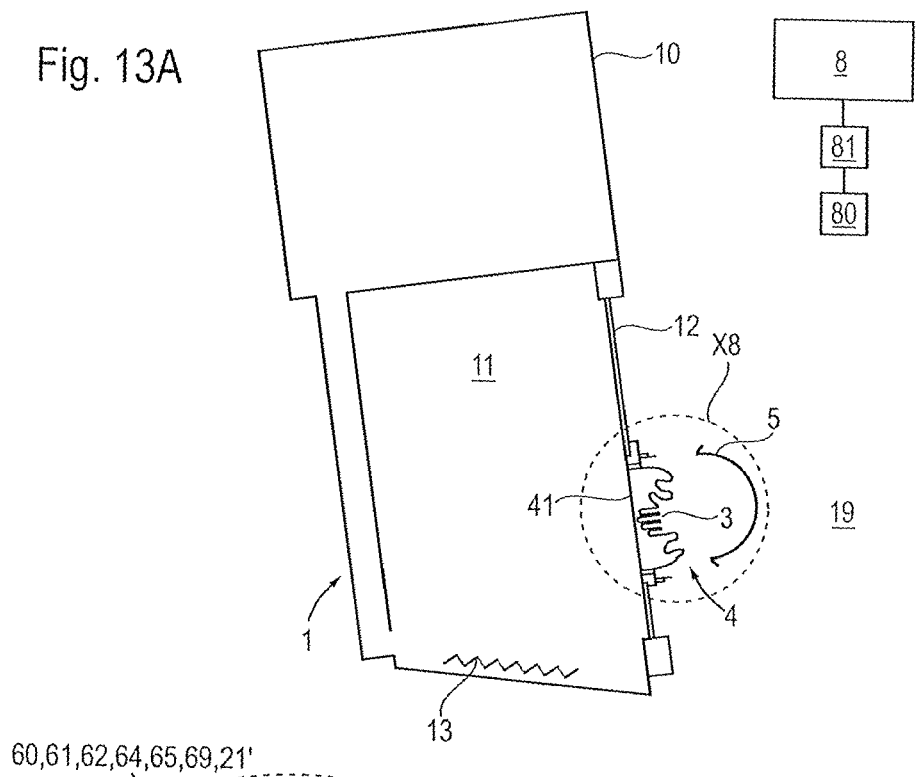
Figure 13B:
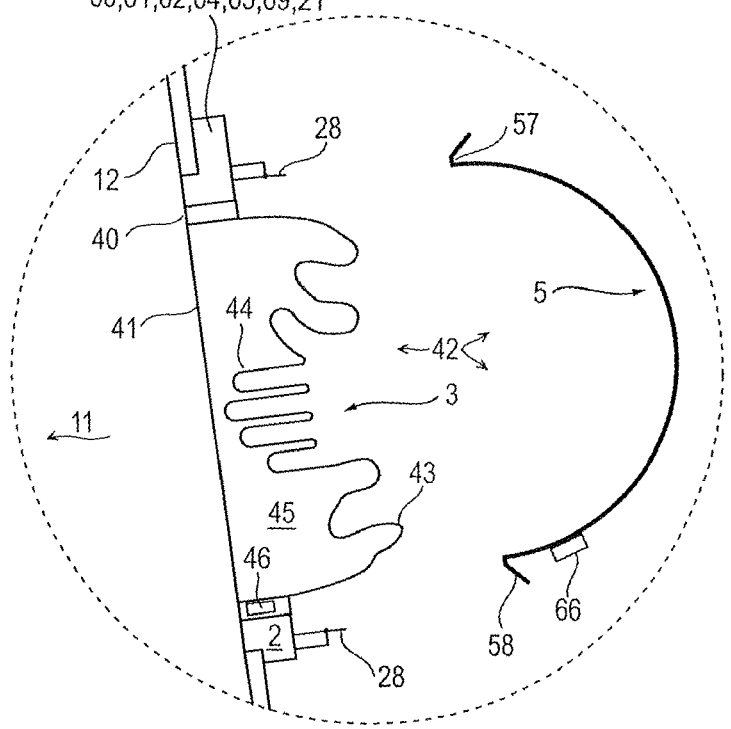

The drawings show:

FIG. 1—a containment position in an installation space, port flange inserted into the front window of said containment, conventional glove fixed to said port flange; an operator intervenes in the work chamber of the containment using the glove according to the prior art;

FIG. 2A—the glove device according to the invention for protected intervention in a containment, first embodiment with closed cover part over the glove, as a schematic diagram;

FIG. 2B—the illustration according to FIG. 2A with cover part distanced from the glove;

FIGS. 3A to 6: the glove device according to the invention in a first embodiment in the phases from installation in a port flange to use by an operator, as schematic diagrams;

FIG. 3A—the containment from FIG. 1 with glove device according to FIG. 2A provided on the containment;

FIG. 3B—the enlarged detail X1 from FIG. 3A;

FIG. 4A—the arrangement according to FIG. 3A with glove device installed in the port flange;

FIG. 4B—the enlarged detail X2 from FIG. 4A;

FIG. 5A—the arrangement according to FIG. 4A with cover part distanced from the glove device;

FIG. 5B—the enlarged detail X3 from FIG. 5A;

FIG. 6—the arrangement according to FIG. 1 with the glove device according to FIG. 2A, operator reaching into the work chamber of the containment;

FIGS. 7 to 9E: the glove device in the first embodiment according to FIG. 2A in combination with different variants of an arrangement for protecting against unauthorized intervention in the containment using the glove from the glove device, as schematic diagrams;

FIG. 7—the glove device in the first embodiment according to FIG. 2A installed in the port flange, closed cover part; in addition in combination the protective arrangement in a first variant, shut-off part integrated in the port flange, currently in the open position, electronic components arranged in the port flange, wireless version, and associated control unit;

FIG. 8A—the glove device in the first embodiment according to FIG. 2A installed in the port flange, closed cover part; in addition in combination the protective arrangement in a second variant, half-shell-like shut-off part which can be docked on the port flange, currently in the blocking position, electronic components arranged in the port flange, wireless version, and associated control unit;

FIG. 8B—the enlarged detail X4 from FIG. 8A;

FIG. 9A—the glove device in the first embodiment according to FIG. 2A installed in the port flange, closed cover part; in addition in combination the protective arrangement in a third variant brought toward the glove device, hood-like shut-off part which can be docked on the port flange, currently in the open position, electronic components arranged in the shut-off part, wired version, and associated control unit;

FIG. 9B—the enlarged detail X5 from FIG. 9A;

FIG. 9C—the arrangement according to FIG. 9A with shut-off part locked on the port flange, third variant, currently in the blocking position, electronic components arranged in the shut-off part, wired version, and associated control unit;

FIG. 9D—the arrangement according to FIG. 9C, in a vertical section;

FIG. 9E—the arrangement according to FIG. 9C, the shut-off part currently in the open position, the cover part distanced and the glove stretched forward into the work chamber;

FIG. 10A—the glove device according to the invention for protected intervention in a containment, second embodiment with closed cover part over the glove, as a schematic diagram;

FIG. 10B—the illustration according to FIG. 10A, shut-off part distanced from the glove;

FIGS. 11A to 14: the glove device in the second embodiment according to FIG. 10A, in addition in combination the protective arrangement in a second variant, half-shell-like shut-off part which can be docked on the port flange, electronic components arranged in the port flange, in the phases from installation in the port flange to use by an operator, as schematic diagrams;

FIG. 11A—the containment from FIG. 1, glove device according to FIG. 10A provided on the containment, wired version, with associated control unit;

FIG. 11B—the enlarged detail X6 from FIG. 11A;

FIG. 12A—the arrangement according to FIG. 11A, glove device installed in the port flange, wireless version with associated control unit;

FIG. 12B—the enlarged detail X7 from FIG. 12A;

FIG. 13A—the arrangement according to FIG. 12A, shut-off part distanced from the glove device, wireless version with associated control unit;

FIG. 13B—the enlarged detail X8 from FIG. 13A; and

Figure 14:
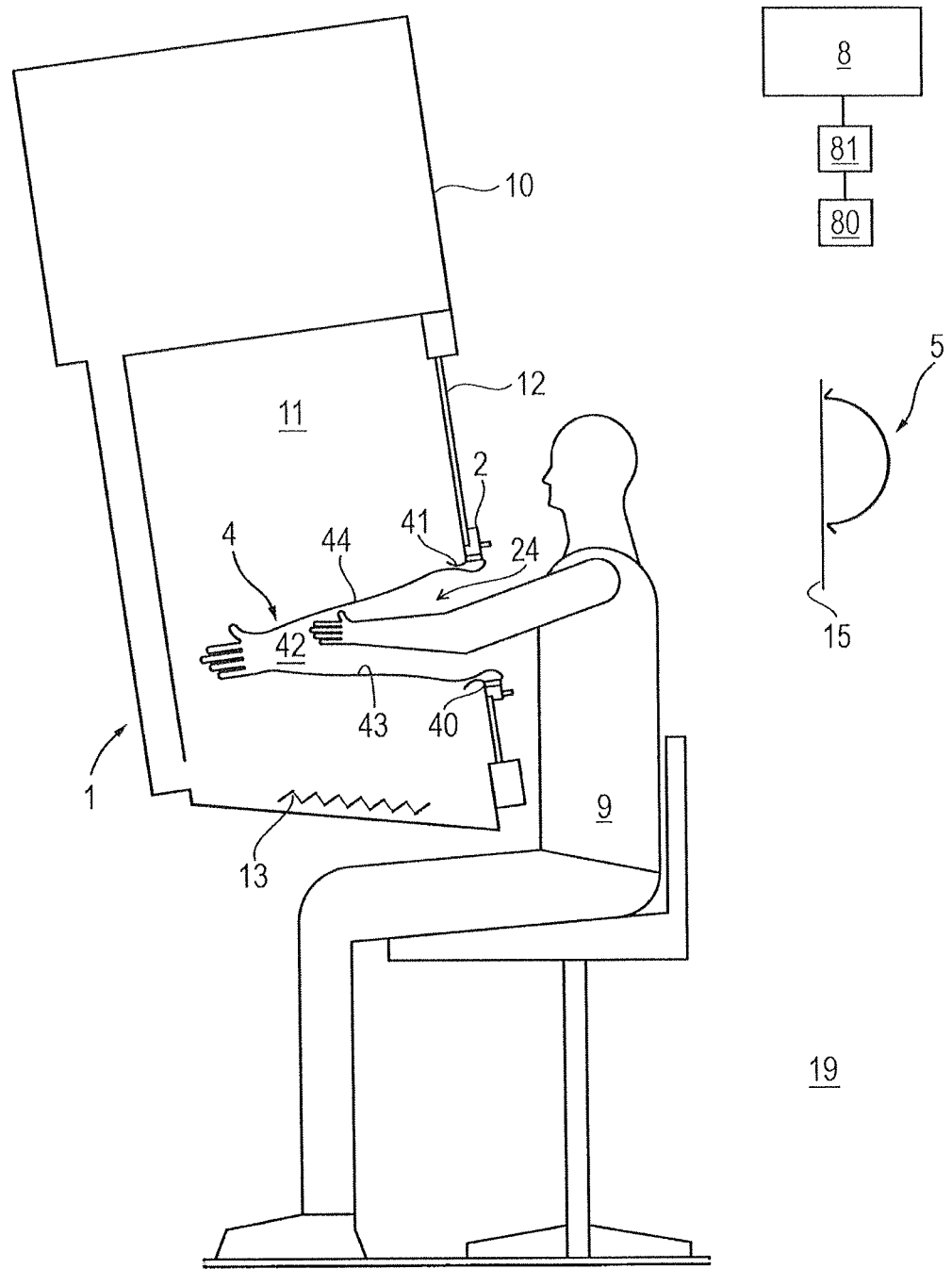

FIG. 14—the arrangement with the glove device from FIG. 13A, operator reaching into the work chamber of the containment.

EXEMPLARY EMBODIMENT

The following detailed description of the glove device according to the invention in two embodiments is provided with reference to the accompanying drawings. The various arrangements for protecting against unauthorized intervention in the work chamber using the glove from the glove device and provided as a completion to both embodiments of the glove device are also described.

The following specification applies for the entire further description. If reference signs are contained in a figure in order to clarify the drawing and it is clearly visible in the drawing that these are "recurring" components although this is not explained in the directly associated text of the description, reference should be made to the explanation of said components in the preceding description of the figures for the sake of brevity.

FIGS. 2A and 2B

This pair of figures relates to a glove device 4, which is formed as a module that can be inserted gas-tight into the port flange 2. On one side the glove device 4 has a seal 41 which is removable or is to be opened, and on the other side the shell-like cover part 7, which is attached gas-tight to the annular fixing part 40 but can be released. The fixing part 40 could also be of an oval geometry. Between the seal 41 and the cover part 7 there lies the glove 3 vacuum-packed in compressed form. The fixing part 40 serves to fasten the glove device 4 to the port flange 2.

The free end of the glove 3 is fastened to the fixing part 40 and/or to the seal 41 in the vicinity of the fixing part 40, wherein the seal 41 at least substantially spans the clear width of the fixing part 40. An RFID chip 46 is arranged in the fixing part 40. At the glove 3, the inner face 43 and the surface 44 are designated. Between the shut-off part 7 adhering to the fixing part 40 and the inner face 43 there lies the interior 42, while between the seal 41 and the surface 44 there is defined a front space 45.

The cover part 7 is preferably made of plastic and has, on its edge 71, a magnetic zone 77, which could be usable to hang the cover part 7 removed from the glove device 4 installed in the port flange 2 in close proximity at a suitable parking station 15 (see FIG. 6). A releasable interlocked and/or positively engaged connection of the cover part 7 to the fixing part 40 consists, for example, of a shaping at the edge 71 of the cover part 7 with complementary shaping at the fixing part 40, an adhesive or a predetermined breaking point between fixing part 40 and cover part 7.

When the cover part 7 is mounted in sealed fashion on the fixing part 40 and the seal 41 is intact (see FIG. 2A), a negative pressure prevails in the interior 42 and in the front space 45. At least the front space 45 with the faces facing it, namely the surface 44 and the inner face of the seal 41, are sterile. Preferably, in the initial situation, the interior 42 with the faces facing it, namely the inner face 43 and the inner side of the shut-off part 7, are also sterile. In the initial situation, the negative pressure existing in the front space 45 causes a concave curvature of the seal 41, which forms an advantageous visual indicator of the correct condition of the glove device 4.

Once the cover part 7 has been removed from the fixing part 40, but the seal 41 remains intact (see FIG. 2B), the interior 42 is open to the atmosphere. The negative pressure previously prevailing in the front space 45 of the glove device 4 also equalizes to the atmospheric pressure due to the elasticity of the glove 3 and seal 41, so that the previously concave curvature of the seal 41 is cancelled out by the pressure equalization that occurs.

The factory-pre-sterilized, packaged glove device 4, which is already largely prepared for installation, results in a significant saving of time and equipment at the location of the containment 1, for example for the pharmaceutical manufacturer, and at the same time in increased product safety. The pulling over onto the ring provided for this purpose, which is necessary with conventional gloves 3 when fitting them into the port flange 2, is no longer required. The glove device 4 with the fixing part 40 can be inserted as a module into the port flange 2 in a very practical manner, for example by means of a gas-tight screw-in or lockable detent, bayonet or clip mechanism, thereby simultaneously reducing the risk of installation errors. The glove device 4 is tested for tightness during factory production and is then vacuum-packed, wherein a preserved concave curvature of the seal 41, which is under mechanical tension, indicates the continued tightness, i.e. the correct condition. The leak test that is otherwise mandatory for conventional gloves 3 after installation can be omitted in the case of the glove device 4. The sterilization of the glove device 4 already carried out at the factory by means of gamma radiation or thermal treatment results in a higher degree of cleanliness than decontamination during the state installed in the containment 1. Moreover, the decontamination time for the installed pre-sterilized glove device 4 is reduced compared to conventional gloves 3, since only the outer face of the seal 41 facing the work chamber 11 of the glove device 4 must be decontaminated, but no longer the entire intricately structured outer face 34 of the glove 3.

FIGS. 3A to 6

This sequence of figures illustrates the glove device 4 according to the invention in a first embodiment in the phases from installation in a port flange 2 to use by an operator 9.

In the first phase, the glove device 4 with the intact, unbroken seal 41, the cover part 7 mounted gas-tight on the fixing part 40 and the glove 3 enclosed therebetween in sterile fashion is provided, and is then brought toward the open access 24 with the seal 41 arranged to the front (see FIGS. 3A+3B).

The glove device 4 produced as a structural unit is then inserted into the port flange 2, wherein the fixing part 40 is gas-tight relative to the port flange 2, the outer face of the seal 41 faces the work chamber 11 and the outer side of the cover part 7 points toward the installation space 19 (see FIGS. 4A+4B). The work chamber 11 should now be decontaminated in order to treat the previously unsterile outer face of the seal 41 and the annular face of the fixing part 40 facing the work chamber 11.

In preparation of the intervention in the work chamber 11 using the glove 3, the cover part 7 must be distanced from the fixing part 40, and thus the negative pressure prevailing previously in the front space 45 equalizes to the atmospheric pressure and the seal 41 loses its concave curvature (see FIGS. 5A+5B).

As last phase for the intervention with the glove 3 in the work chamber 11, the operator 9 moves with his hand from outside into the glove 3 and first penetrates the seal 41 in order to then enter further into the work chamber 11 (see FIG. 6). Depending on the nature of the seal 41, a tool could be used to penetrate or open the seal 41 as a result of the detachment thereof, however, the use of said tool precludes any damage to the glove 3. It may be advantageous to open the seal 41 from the interior of the work chamber 11, for example with a robot belonging to the equipment 13.

FIGS. 7 to 9E

This sequence of figures illustrates the glove device 4 in the first embodiment according to FIGS. 2A+2B, in combination with different variants of an arrangement for protecting against unauthorized intervention in the containment 1 using the glove 3 from the glove device 4.

FIG. 7

Structure of the Arrangement

This protective arrangement initially comprises the combination of glove device 4 installed in the port flange 2 with fitted cover part 7 and the shut-off part 5 integrated directly in the port flange 2, the shut-off part for example being formed as an iris diaphragm or formed in a pivotable, stretchable, shutter-like or expandable manner. The port flange 2 contains, as fixedly position electronic components, the active safety sensor 21', the battery 60, the display 61, the capture unit 62, the microcontroller 64, the transmitting/receiving element 65 and the activator 69 which moves the shut-off part 5. A passive safety sensor 66 is mounted on the movable shut-off part 5. An RFID chip 46 is accommodated in the fixing part 40. As a wireless version, the transmitter/receiver 80 is connected to the assembly of external control unit 8 and safety relay 81. This is thus the wireless version because in normal operation there are no cables 67,68 provided for signal conductance and power supply of the relevant electronic components. The battery 60 in the port flange 2 is now solely responsible for the power supply of the electronic components 61,62,64,65,21' and 69 contained in the port flange 2. By contrast, a wired version is shown for the first time in FIGS. 9A+9B.

Function of the Arrangement

Following the installation of the protective arrangement, the containment 1 could be put into operation. To this end, the glove device 4 is first inserted into the access 24 in the port flange 2. The transmitting/receiving element 65 reads the serial number from the RFID chip 46 in the glove device 4 and stores it in the database, provided for this purpose, in the control unit 8. If the glove device 4 is not acceptable, this is determined by the control unit 8. The operator 9 is instructed to install another glove device 4. If, however, everything was in order, the shut-off part 5 will have been moved into the blocking position, driven by the activator 69. The containment 1 started the operating mode; the equipment 13 ran in the work chamber 11, for example for the purpose of filling a medicament.

Due to the shown open position of the shut-off part 5, it can be seen that an operator 9 has already advanced far in gaining access 24 to the work chamber 11 using the glove 3. To this end, the operator 9, after having been successfully identified at the capture unit 62, receives authorization to bring the shut-off part 5, formed as an iris diaphragm, into the open position. The capture unit 62 can be used to record biometric identifiers of the operator 9, a code to be input by the operator 9, or the electronic data of a data carrier to be presented by the operator 9.

The microcontroller 64 analyzes the personal data, containing the predefined user data, received by the capture unit 62 from the database stored in the control unit 8 for access authorization. These data can also be stored individually in each microcontroller 64. The microcontroller 64 communicates wirelessly, for example via WLAN, via the transmitting/receiving element 65 with the control unit 8 and transmits the corresponding data.

If the operator 9 does not receive access authorization due to hierarchy, machine mode, current process step or status of the glove device 4 (for example ascertained damage), this is displayed on the display 61 and there is no further action. If the operator 9 is deemed to be authorized, the equipment 13 is firstly stopped in a controlled manner. The release is then transmitted via the microcontroller 64 to the activator 69 mounted in the port flange 2, and said activator moves the mechanical shut-off part 5 from the previous blocking position into the open position by pivoting it away or rotating it, depending on the design of the shut-off part. The access 24 is thus opened in a first step.

As soon as the shut-off part 5 driven by the activator 69 moved toward the open position, that is to say the passive safety sensor 66 was distanced from the active safety sensor 21', the active safety sensor 21' lost the signal. The active safety sensor 21' continuously transmitted its signal wirelessly via the transmitting/receiving element 65 to the transmitter/receiver 80, and this transmitted the data, but in wired fashion, to the safety relay 81. As a result of the signal interruption, the safety relay 81 blocked the equipment 13 in the work chamber 13; it was now no longer possible to re-start the equipment 13.

At the same time as the opening of the shut-off part 5, the transmitting/receiving element 65 was activated via the microcontroller 64 and read the RFID chip 46 in the associated glove device 4 and compared the serial number thereof with the identifier stored in the control unit 8. In the control unit 8, the current intervention is then noted in the database for the relevant port flange 2.

If a critical or inadmissible state is created for the glove 3 or for the glove device 4 due to the new use, this is communicated to the operator 9 via the display 61 at the port flange 2. This information is stored in the database of the control unit 8 so that the further use is no longer possible or is only still possible under limiting conditions. These shall be defined individually by a system administrator. If damage is indicated, for example as a result of incorrect handling of the equipment 13, a glove device 4 can thus be classified as "defective and blocked for the batch".

If the shut-off part 5 is currently already in the open position, but the access 24 is not yet completely unobstructed, the entire glove device 4 with the intact seal 41, the cover part 7 fitted on the fixing part 40 and the glove 3 compressed therebetween still block the access 24. In order to intervene in the work chamber 11 using the pre-sterilized glove 3 still compressed in the glove device 4, the cover part 7, which is mounted gas-tightly on the fixing part 40, must first be removed and then the seal 41, which has previously been decontaminated on the outer face, must then be penetrated with the advanced glove 3 or opened in another way, for example from the interior of the work chamber 11, preferably with a robot belonging to the equipment 13.

FIGS. 8A and 8B

This pair of figures illustrates the glove device 4 installed in the port flange 2, in the first embodiment according to FIG. 2A with closed cover part 7. Also shown in combination is the protective arrangement in a second variant with the half-shell-like shut-off part 5 docked on the port flange 2, currently in the blocking position. As in the previous figure, this is a wireless version and again all electronic components 21',60,61,62,64,65 and 69 are arranged in the port flange 2. The special feature lies here in the fact that, instead of the shut-off part 5 integrated directly in the port flange 2, a separate half-shell-like shut-off part 5 is provided, which has an extension 58. This shut-off part 5 is fitted releasably on the fixing part 40, wherein the extension 58 can be locked with a switchable retaining element 28 extending from the port flange 2. The retaining element 28 is driven by the activator 69 between the "open" or "closed" switch positions or is released so as to be moved manually. The passive safety sensor 66 is now positioned on the separate shut-off part 5 (see FIGS. 10A+10B). The operation of the containment 1, the signal processing and the handling with the protective arrangement are equivalent to FIG. 7; instead of the shut-off part 5 integrated in the port flange 2, only the separate half-shell-like shut-off part 5 is to be moved from its blocking into the open position, in order to open the access 24 in a first step with the glove device 4 mounted in the port flange 2 with the cover part 7.

FIGS. 9A to 9D

This design is based on the first embodiment of the glove device installed in the port flange 2 according to FIGS. 2A+2B with the cover 7, in combination with the protective arrangement in a third variant, specifically a hood-like shut-off part 5, which can be docked on the port flange 2. Most of the electronic components 60,61,62,64,65,66 and 69 are now accommodated in this shut-off part 5 with its housing 50. The handle 59 serves for user-friendly handling. The active safety sensor 21 and the RFID chip 22 are located in the port flange 2, and the cables 67,68 for power supply and signal conductance lead to the port flange 2. This design is therefore said to be the wired version. In normal operation, power is supplied to the relevant electronic component via the second cable 68. The installed battery 60 serves as an emergency unit in the event of a power failure in order to still perform any relevant actions at the containment 1 over a limited timespan. The port flange 2 also has the first docking elements 25, which in the blocking position of the shut-off part 5 serve for locking to the complementary second docking elements 55 on the shut-off part 5. The second docking elements 55 are driven by the activator 69 between the "open" or "closed" switch positions or is released so as to be moved manually.

As before, the transmitting/receiving element 65 provided in the shut-off part 5 reads and processes the serial number stored in the RFID chip 46 mounted in the fixing part 40 of the glove device 4 as the shut-off part is brought toward the port flange 2. At the same time, the transmitting/receiving element 65 also reads the position identifier assigned to the port flange 2 in question, said position identifier being contained in the RFID chip 22 positioned in the port flange 2. The position identifiers and serial numbers detected in the event that multiple port flanges 2 are provided on a containment 1 and multiple glove devices 4 are inserted in said port flanges are stored in the database, provided for this purpose, in the control unit 8. This allows the assignment of a particular shut-off part 5 to the associated port flange 2. If, for example, a shut-off part 5 is fitted on a non-associated port flange 2 and the shut-off part 5 of said port flange is fitted on the other port flange 2, this mix-up is recorded in the control unit 8. Depending on the embodiment, the incorrect fitting is then communicated via the display 62, or the new positions of the shut-off parts 5 overwrite the old positions. If the shut-off part 5 is correctly mounted on the intended port flange 2, the first and second docking elements 25,55 are oriented relative to one another, and they are locked by the actuation of the activator 69.

FIGS. 10A and 10B

This pair of figures relates to a glove device 4 in the second embodiment, which is likewise formed as a module that can be inserted gas-tight into the port flange 2. In contrast to FIGS. 2A+2B according to the first embodiment, instead of the cover part 7, a half-shell-like shut-off part 5 with dual function now belongs to the glove device 4, specifically firstly as a gas-tight sheathing of the glove 3, releasable from the fixing part 40, together with the seal 41, and also, in the state installed in the port flange 2, as a shut-off part 5 lockable to the port flange 2.

In addition to the explanation for FIGS. 8A+8B, it should also be noted in respect of the differences between the glove devices 4 of the first and second embodiment that a magnetic zone 57 is provided, for example adjacently to the edge 51, and could be usable in order to hang the shut-off part 5 removed from the glove device 4 installed in the port flange 2 in close proximity at a suitable parking station 15 (see FIG. 14). Otherwise, reference is made to the glove device 4 according to the first embodiment with FIGS. 2A+2B in respect of similarities in construction and operating principle.

FIGS. 11A to 14

This sequence of figures is based on the glove device of the second embodiment according to FIGS. 10A+10B, combined with the protective arrangement of the second variant, that is to say the half-shell-like dual-function shut-off part 5, in the phases from installation in the port flange to use by an operator 9.

FIGS. 11A and 11B

Illustrated is the wired version as a structure with the glove device 4 which is ready for installation in the port flange 2. The access 24 into the work chamber 11 is open. The fact that the glove device 4 has not yet been used, i.e. the internal pre-sterilized state has been preserved and the shut-off part 5 is mounted gas-tightly as a releasable component on the fixing part 40, can be seen from the concave curvature of the seal 41. The port flange 2 has all the electronic components 21,60,61,62,64,65 and 69, and the two cables 67,68 are connected. The passive safety sensor 66 is mounted on the shut-off part 5, and the RFID chip 46 is arranged in the fixing part 40 of the glove device 4. To dock the glove device 4 with the extension 58 extending from the mounted shut-off part 5, the retaining element 28 on the port flange 2 must be in the "open" position. It is assumed that the operator 9 already finds the "open" position on the retaining element 28 in this way or is authorized to trigger the switching pulse to the activator 69. The control unit 8 connected to the safety relay 81 is located externally on the containment 1.

FIGS. 12A and 12B

This pair of figures shows the advanced installation of the glove device 4 in the port flange 2, wherein furthermore the shut-off part 5 is mounted gas-tight on the fixing part 40 and the seal 41 is intact according to its concave curvature. To illustrate the possible range of variation in the design of the protective arrangement, the wireless version is shown here. Therefore, a transmitter/receiver 80 is again connected to the assembly of external control unit 8 and safety relay 81.

When, as the glove device 4 is approached for installation in the port flange 2, a sufficient proximity between the RFID chip 46 accommodated in the fixing part 40 and the transmitting/receiving element 65 arranged in the port flange 2 is reached, the serial number of the glove device 4 is read and compared with the database in the control unit 8, after which the operator 9 is shown on the display 61 a correct or incorrect assignment between port flange 2 and approached glove device 4. If the assignment is incorrect, the locking between the extension 58 and the retaining element 28 is refused, which requires action by the operator 9, namely either the provision of a suitable glove device 4 or—if possible—an overwriting of the entry in the database, in order to continue.

When the installation is completed per se, the operator 9 must enter his identification via the capture unit 62 in order to check his authorization for the installation. If the assignment is correct and authorization is granted for the operator 9, the activator 69 receives the switching command via the control unit 8 and the microcontroller 64 to switch the retaining element 28 to the "closed" position, whereby the extension 58 and retaining element 28 are locked together so that the shut-off part 5 comes into blocking position and cannot be removed without authorization. Access to the glove 3 lying in the vacuum and advancement into the work chamber 11 are blocked. Correct insertion of the glove device 4 on the port flange 2 is confirmed via the display 61. In particular, the database of the control unit 8 records which glove device 4 was installed on which port flange 2 by which operator 9 and when.

In the blocking position, the active safety sensor 21 detects the defined proximity of the passive safety sensor 66, picks up the signal and continuously transmits its signal wirelessly via the transmitting/receiving element 65 to the transmitter/receiver 80, but the latter, however, transmits the data in wired fashion to the safety relay 81. With the continuous signal flow, the safety relay 81 does not cause blocking of the equipment 13 in the work chamber 11, and the operating mode for the containment 1 and equipment 13 can be started. In a next step the work chamber 11 is decontaminated to treat the non-sterile outer face of the seal 41.

FIGS. 13A to 14

This sequence of figures follows on from the previous pair of FIGS. 12A+12B, also in the wireless version, in terms of the structure and operating principle of the arrangement. Here, the authorized removal of the shut-off part 5 from the glove device 4 to produce the open position so that the operator 9 can intervene in the work chamber 11 through the access 24 using the glove 3 pushed out of the glove device 4 will now be discussed.

With reference to the explanations of FIGS. 7+8A,8B, there is no need to describe again the circuits on the device side or the signal-processing sequence, and therefore the following discussion is limited to the special features resulting from the use of this glove device 4. Thus, it is assumed that the operator 9 has received the authorization to remove the shut-off part 5 from the glove device 4, whereupon the retaining element 28 already switched to the "open" position by the activator 69, i.e. the locking between the retaining element 28 and the extension 58, is canceled. At the latest with the onset of the removal of the shut-off part 5 from the fixing part 40, a signal interruption occurs between the passive safety sensor 66 and active safety sensor 21', which causes a blocking of the equipment 13 in the work chamber 11, as already described several times.

Once the shut-off part 5, which can be deposited at the parking station 15, for example by means of the magnetic zone 57, has been released, access to the glove 3 is opened and the interior 42 is open toward the installation space 19. Thus, sterility is lost on the inner face 43 of the glove 3, but not in the front space 45 with the adjacent faces. The intact seal 41, which is now planar due to the atmospheric pressure acting on it from the concave curvature, prevents contamination caused by overflowing gases or particles from penetrating from the work chamber 11 into the front space 45.

The operator 9 can now reach into the initially still compressed glove 3 from the outside and can stretch it forward in the direction of the work chamber 11, thereby penetrating the seal 41, which is now sterile on both sides. In each case after an intervention, it is advisable to place the glove 3 in the shut-off part 5, which has not yet been locked again. After this, the shut-off part 5 is again fitted on the fixing part 40 and locked by means of the retaining element 28 and extension 58, so that the shut-off part 5 is again in the blocking position and can only be removed again with the current authorization, in order to permit a next intervention in the work chamber 11 through the open seal 41 and the access 24 in the port flange 2 using the glove 3.

In particular, the database of the control unit 8 records by which glove device 4, equipped with which glove 3, at which port flange 2, by which operator 9, when and over which period of time, which shut-off part 5 has been moved between blocking position and open position.

The invention claimed is:

1. A glove device with a glove for protected intervention in a work chamber of a containment through an access present in a port flange, wherein:
   a) the port flange is installed in a front window or in a wall of a housing of the containment positioned in an installation space; and
   b) equipment for processing a material to be treated can be provided in the work chamber, wherein:
   c) the glove device is designed as a module, in the form of an insert, which can be inserted gas-tight into the port flange; and comprises:
   da) a seal, which is arranged on one side and is removable or is to be opened;
   db) on the other side a cover part, which is releasable from the module;
   de) the glove vacuum-packed between the two sides, which glove has an inner face and a surface
   df) a free end of the glove is fastened to a fixing part and/or to the seal in the vicinity of the fixing part, wherein the seal at least substantially spans the clear width of the fixing part; and
   dg) when the cover part is mounted on the glove device and the seal is intact, the seal is visually noticeably curved concavely relative to the glove device as a result of a negative pressure between the cover part and the seal.

2. The glove device as claimed in claim 1, wherein the glove device also has a fixing part, which is intended to be fastened gas-tight to the port flange.

3. The glove device as claimed in claim 1, wherein:
   a) the fixing part being annular or oval and comprising plastic; and
   b) the cover part being shell-like and comprising plastic.

4. The glove device as claimed in claim 1, wherein when the cover part is mounted on the glove device and the seal is intact:
   a) a front space lies between the seal and the surface of the glove, the front space having a negative pressure; and
   b) the front space and an inner face of the seal facing said front space and the surface of the glove are sterile.

5. The glove device as claimed in claim 1, wherein when the cover part is fitted on the glove device and the seal is intact:
   a) an interior lies between the inner face of the glove and the cover part or shut-off part, the interior having a negative pressure; and
   b) the interior and an inner face of the cover part facing said interior and the inner face of the glove are sterile.

6. The glove device as claimed in claim 1, wherein an RFID chip is arranged in a fixing part and has, stored therein, an individual serial number and its production data.

7. The glove device as claimed in claim 6, wherein the RFID chip is writable and all new actions at the glove device, including those at the glove, are captured and added in the RFID chip or in a control unit to individual maintenance data of the glove device.

8. The glove device as claimed in claim 6, wherein:
   c) the production data of each glove device can comprise:
      aa) the individual serial number,
      ab) a production date;
      ac) glove size;
      ad) a material type;
      ae) a used sterilization method;
      af) a maximum use-by date; and
   d) maintenance data of each glove device can comprise:
      ba) a date of installation in a port flange;
      bb) personal data of the installer;

bc) an identifier of the port flange on which the installation was performed;

bd) when, how often and by which operator a shut-off part at the relevant glove device was brought into a blocking position or moved therefrom into an the open position;

be) time and count of number of decontamination cycles at the work chamber of the containment and a maximum permissible number of decontamination cycles;

bf) time and number of leak tests performed on the relevant glove device;

bg) batches and products which are handled in the work chamber of the containment and for which the relevant glove device is used;

bh) special instructions to be input manually by the operator; and bi) personal data of the installer performing the disassembly and disposal of a relevant glove device.

9. The glove device as claimed in claim 1, wherein:

a) the cover part has a magnetic zone which is intended for cooperation with a fixing part in order to additionally secure the cover part temporarily; wherein b) if the cover part is released from the glove device, the magnetic zone can also be used in order to deposit the cover part at a parking station.

* * * * *